(12) United States Patent
Ide et al.

(10) Patent No.: US 11,688,988 B2
(45) Date of Patent: Jun. 27, 2023

(54) ELECTRONIC DEVICE, INLET UNIT AND WELDING METHOD

(71) Applicant: CANON KABUSHIKI KAISHA, Tokyo (JP)

(72) Inventors: Takumi Ide, Kanagawa (JP); Akira Tatsuzue, Saitama (JP); Hiroshi Fuse, Tokyo (JP); Masamichi Iida, Kanagawa (JP); Junji Suzuki, Shizuoka (JP); Takahiro Yoneyama, Tokyo (JP); Toshiro Sonoda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 17/240,850

(22) Filed: Apr. 26, 2021

(65) Prior Publication Data
US 2021/0344154 A1    Nov. 4, 2021

(30) Foreign Application Priority Data

| May 1, 2020 | (JP) | ................................ | 2020-081432 |
| May 1, 2020 | (JP) | ................................ | 2020-081433 |
| Jun. 19, 2020 | (JP) | ................................ | 2020-105971 |
| Jun. 19, 2020 | (JP) | ................................ | 2020-105972 |
| Jan. 13, 2021 | (JP) | ................................ | 2021-003570 |

(51) Int. Cl.
| *H01R 3/00* | (2006.01) |
| *H01R 43/02* | (2006.01) |
| *B23K 11/11* | (2006.01) |
| *B23K 11/00* | (2006.01) |
| *H01R 43/16* | (2006.01) |
| *H01R 13/04* | (2006.01) |
| *B23K 101/38* | (2006.01) |
| *H01R 105/00* | (2006.01) |

(52) U.S. Cl.
CPC ............ *H01R 43/02* (2013.01); *B23K 11/002* (2013.01); *B23K 11/115* (2013.01); *H01R 13/04* (2013.01); *H01R 43/16* (2013.01); *B23K 2101/38* (2018.08); *H01R 2105/00* (2013.01)

(58) Field of Classification Search
CPC ............. H01R 13/7175; H01R 25/006; H01R 23/025; H01R 4/72; H01R 13/465
See application file for complete search history.

(56) References Cited

U.S. PATENT DOCUMENTS

| 6,910,920 | B2 * | 6/2005 | Su ...................... H01R 13/4223 439/106 |
| 7,447,002 | B2 * | 11/2008 | Ewing .................. H01H 85/545 174/59 |
| 8,545,275 | B2 * | 10/2013 | Wang ..................... H01R 24/22 439/732 |
| 2015/0000956 | A1 | 1/2015 | Spinella ................. B23K 11/20 |

(Continued)

FOREIGN PATENT DOCUMENTS

| JP | 3311061 B | 8/2002 |
| JP | 5723992 B | 5/2015 |
| JP | 2016-523718 | 8/2016 |

*Primary Examiner* — Phuong Chi Thi Nguyen
(74) *Attorney, Agent, or Firm* — Venable LLP

(57) ABSTRACT

An electronic device includes an inlet including a ground terminal having a first surface and a second surface opposite from the first surface, a first casing metal plate configured to hold the inlet and contacting the first surface of the ground terminal, and a second casing metal plate contacting the second surface of the ground terminal.

13 Claims, 31 Drawing Sheets

(56) References Cited

U.S. PATENT DOCUMENTS

2021/0344154 A1\* 11/2021 Ide ......................... B23K 11/20
2022/0360003 A1\* 11/2022 Chen ...................... H01R 12/55
2022/0385008 A1\* 12/2022 Iwamoto ................ H01R 24/50
2022/0416466 A1\* 12/2022 Huang ................. H01R 13/502
2023/0011196 A1\* 1/2023 Chang ............... H01R 13/7175

\* cited by examiner (a)

(b)

(a)

(b)

(a)

(b)

(a)

(b)

(a)

(b)

(c)

ELECTRONIC DEVICE, INLET UNIT AND WELDING METHOD

FIELD OF THE INVENTION AND RELATED ART

The present invention relates to an electronic device including an inlet unit to which an AC voltage is inputted, and a welding method of a ground terminal (earth terminal) of the inlet unit.

The electronic device generally includes an AC inlet, and a power supply (source) cord is engaged with the AC inlet, so that AC electric power is supplied to the electronic device. A metal plate used for a casing of the electronic device is electrically joined to a ground terminal of the AC inlet provided in the electronic device in order to satisfy an electrical performance. Here, the electrical performance is, for example, a shield effect for shielding radiation noise from an electrical substrate provided inside the electronic device. As the metal plate, iron has been widely used for reasons such that the iron is inexpensive, easy to process, readily available, and has relatively low electrical conductivity and the like. On the other hand, the ground terminal of the AC inlet is based on the premise that a current flows through the ground terminal, and therefore, high electrical conductivity is essential, and copper has been widely used for reasons such that copper is readily available and inexpensive.

In an electrically joining method between the ground terminal of the AC inlet and the metal plate of the casing of the electronic device, constitutions disclosed in Japanese Patents Nos. 3311061 and 5723992 have been known. Japanese Patent No. 3311061 discloses the constitution in which the metal plate and the ground terminal of the AC inlet are joined and fastened to each other by a screw. However, in order to establish safe grounding joint by fastening with the screw, there is a need to fasten the metal plate and the ground terminal by a screw provided with a spring washer, and a hole for fastening the screw has to be formed on the metal plate side of the casing. In addition, a screwing operation by an operator is required. Japanese Patent No. 5723992 discloses the constitution in which the casing metal plate and the ground terminal of the AC inlet are joined to each other by soldering. However, the soldering requires solder and a soldering operation by the operator.

Therefore, as a method in which an additional component part is not needed, welding would be considered. In general, in so-called dissimilar metal joint (welding) in which different metal materials are welded to each other, a method such that two metal materials are superposed on each other and are sandwiched and pressed by a pair of electrodes and thus a current is caused to flow through the two metal materials (hereinafter, this method is referred to as pressing energization) has been known. Japanese Laid-Open Patent Application (Tokuhyo) 2016-523718 discloses a method for ensuring mechanical strength by the following welding. That is, a method in which in dissimilar metal joint of two metal materials such as aluminum and steel which are largely different in melting point, the metal material with a low melting point is sandwiched by the metal materials with a high melting point and is melted by heat generated by pressing energization with electrodes and thus the metal materials with the high melting point are contacted and welded to each other is used.

However, the ground terminal of the AC inlet and the metal plate of the casing of the electronic device are intended to be subjected to be subjected to the pressing energization, the following problem arises. In general, the ground terminal of the AC inlet is made of a tin-plated copper-based material and has a property such that copper (Cu) which is a base material of the electrodes for the pressing energization and tin (Sn) which is the material of the ground terminal are liable to react with each other. For this reason, a fastened portion changes to a Cu—Sn-based alloy (bronze), and the Cu/Sn-based alloy is relatively brittle, and therefore, the electrodes gradually break, so that a contact area of each of the electrodes changes. When a change in contact area of the electrode becomes large, a necessary current does not flow during the welding and thus desired heat generation cannot be obtained. For that reason, there is a need to polish the electrodes or exchange the electrodes themselves, so that the change in contact area of the electrode leads to a lowering in productivity.

SUMMARY OF THE INVENTION

According to an aspect of the present invention, there is provided an electronic device comprising: an inlet including a ground terminal having a first surface and a second surface opposite from the first surface; a first casing metal plate configured to hold the inlet and contacting the first surface of the ground terminal; and a second casing metal plate contacting the second surface of the ground terminal.

Further features of the present invention will become apparent from the following description of exemplary embodiments with reference to the attached drawings.

BRIEF DESCRIPTION OF THE DRAWINGS

Part (a) of FIG. 1 is a schematic view showing a structure of an AC inlet and a casing metal plate in an embodiment 1, and part (b) of FIG. 1 is a schematic view showing a state during joint between a ground terminal of the AC inlet and the casing metal plate.

Part (a) of FIG. 2 is a schematic view showing a structure of an AC inlet and casing metal plates in another case of the embodiment 1, and part (b) of FIG. 2 is a schematic view showing a state during joint between a ground terminal of the AC inlet and the casing metal plates.

Figure 3:
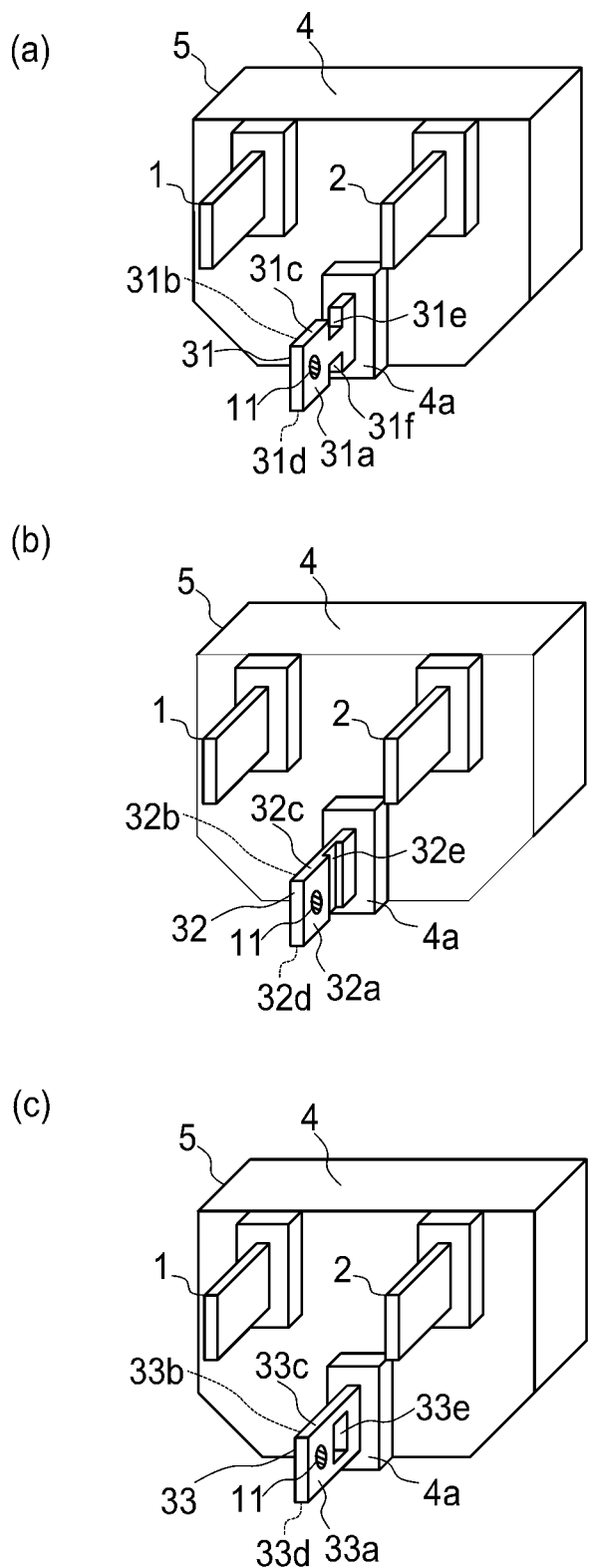

Parts (a) to (c) of FIG. 3 are schematic views each showing a shape of a ground terminal of an AC inlet in an embodiment 2.

Figure 4:
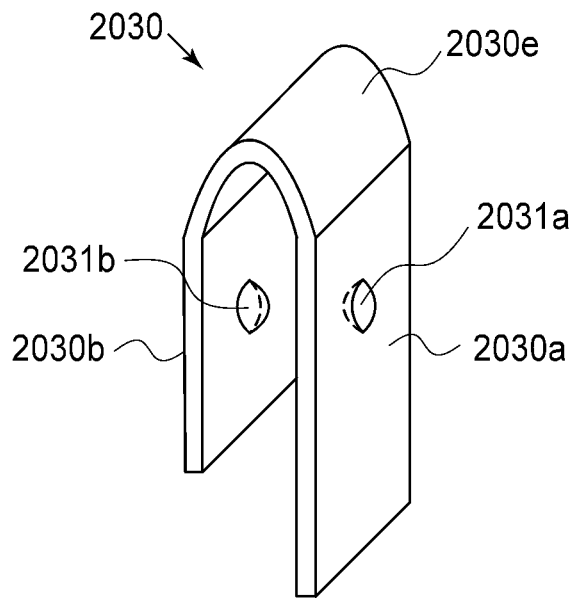
Figure 4:
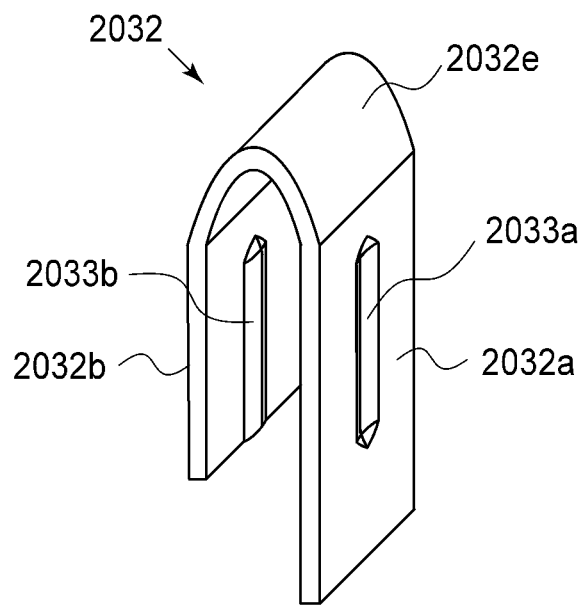

Parts (a) and (b) of FIG. 4 are schematic views each showing a structure of projected portions of a metal plate in an embodiment 3.

Figure 5:
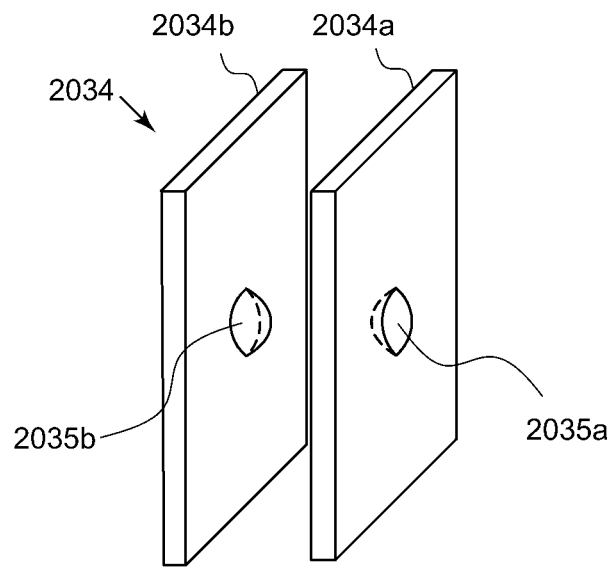
Figure 5:
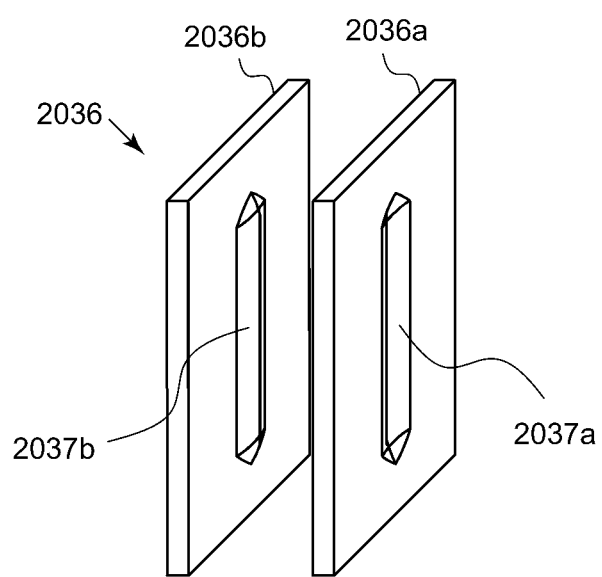

Parts (a) and (b) of FIG. 5 are schematic views each showing another case of a structure of projected portions of metal plates in the embodiment 3.

Figure 6:
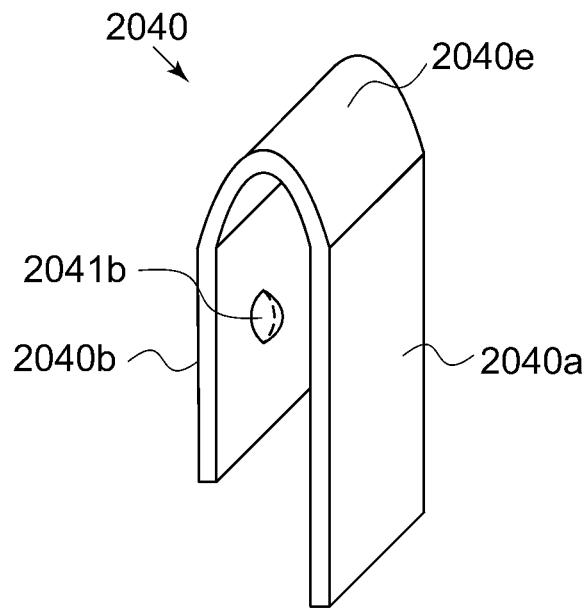
Figure 6:
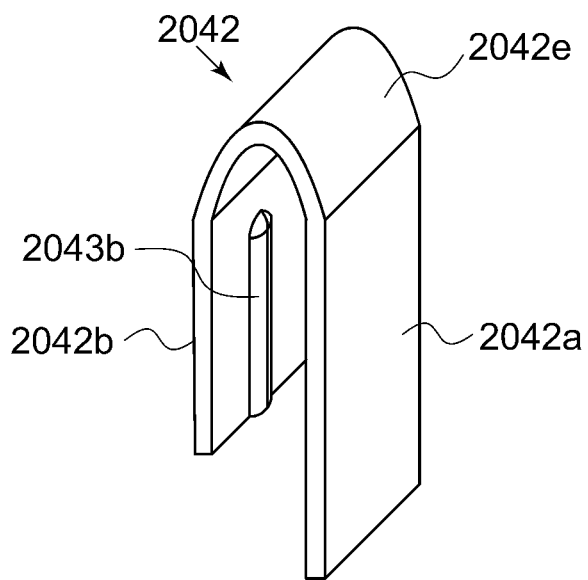

Parts (a) and (b) of FIG. 6 are schematic views each showing a structure of a projected portion of a metal plate in an embodiment 4.

Figure 7:
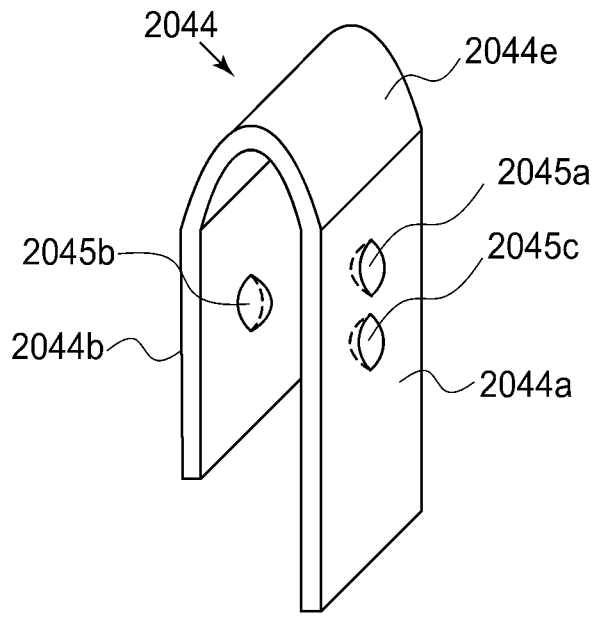
Figure 7:
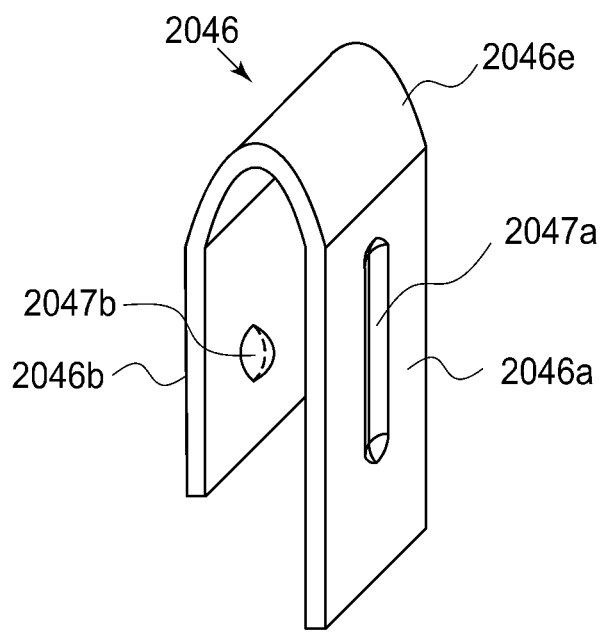

Parts (a) and (b) of FIG. 7 are schematic views each showing another case of a structure of projected portions of metal plates in the embodiment 4.

Figure 8:
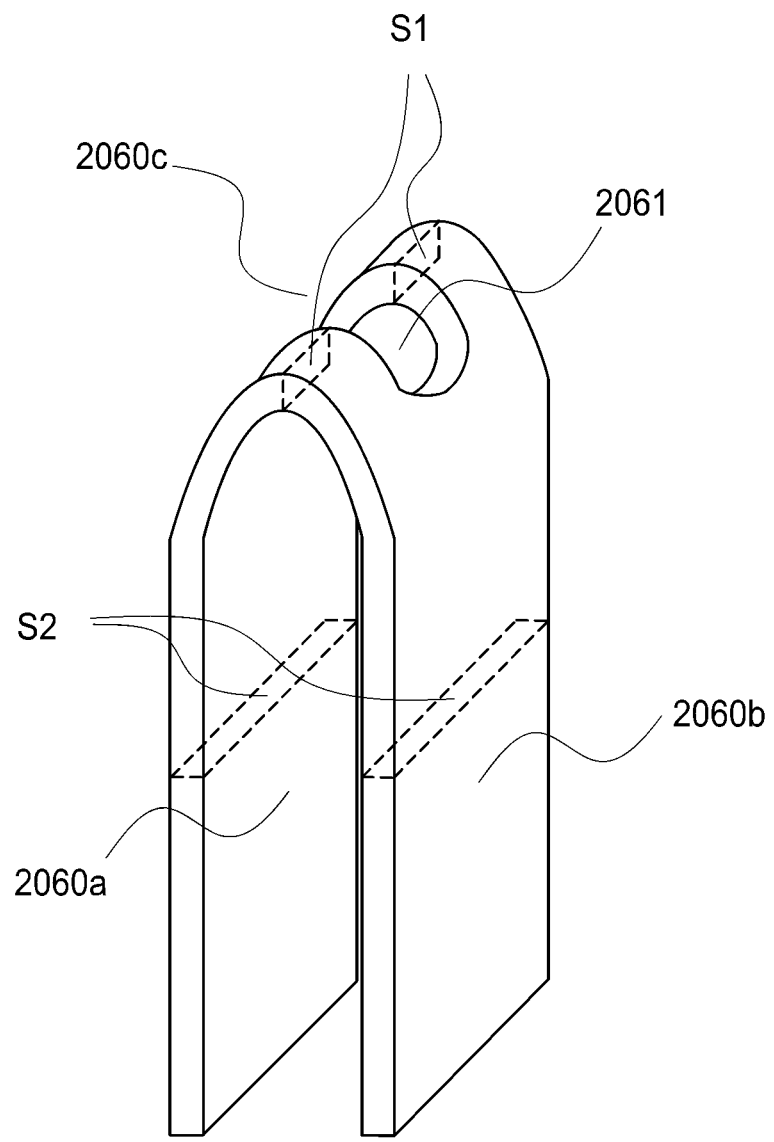

FIG. 8 is a schematic view showing a structure of a welding portion of a metal plate in an embodiment 5.

Figure 9:
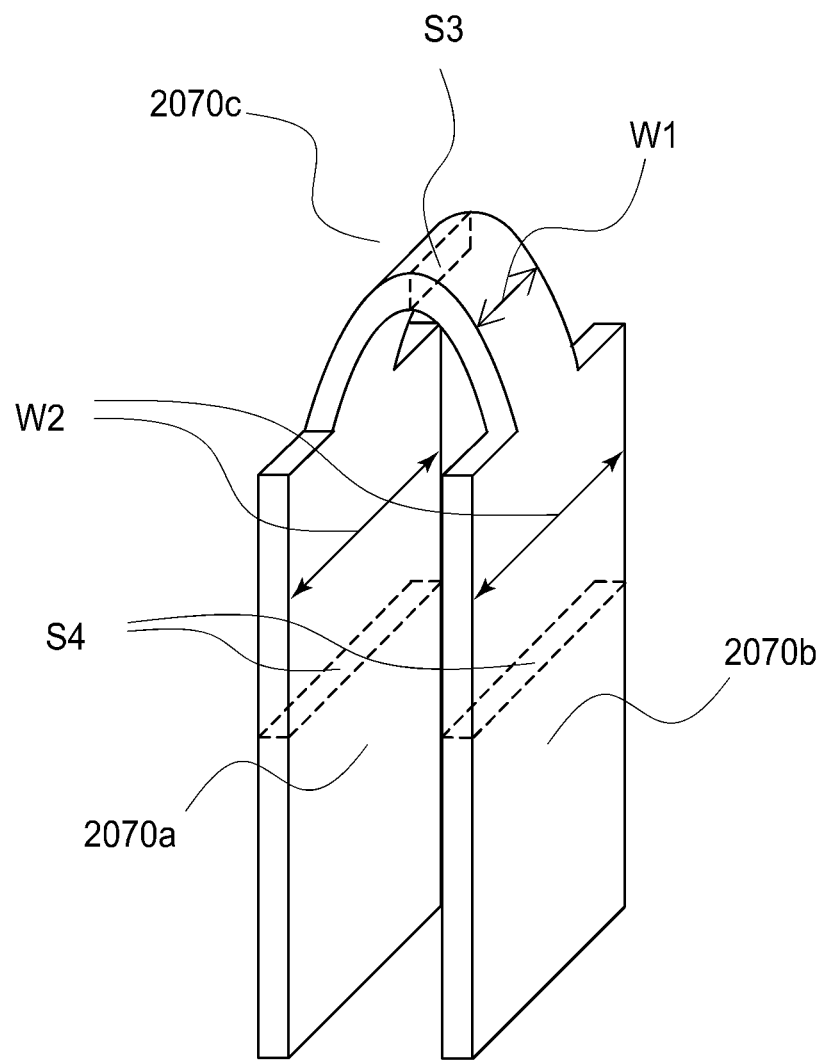

FIG. 9 is a schematic view showing another structure of a welding portion of a metal plate in the embodiment 5.

Figure 10:
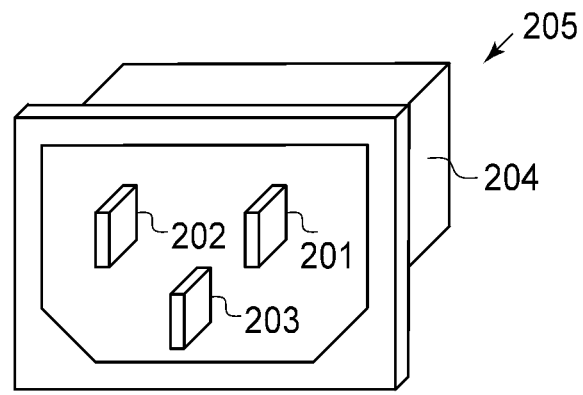
Figure 10:
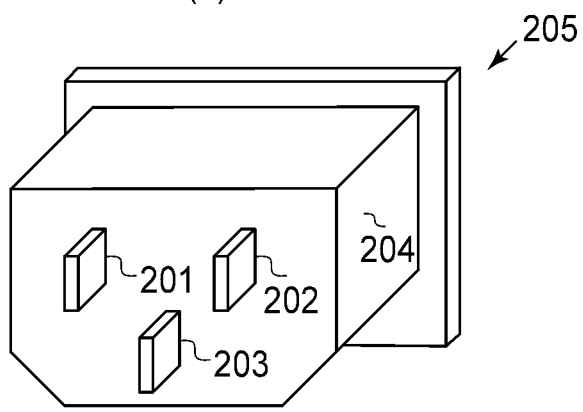
Figure 10:
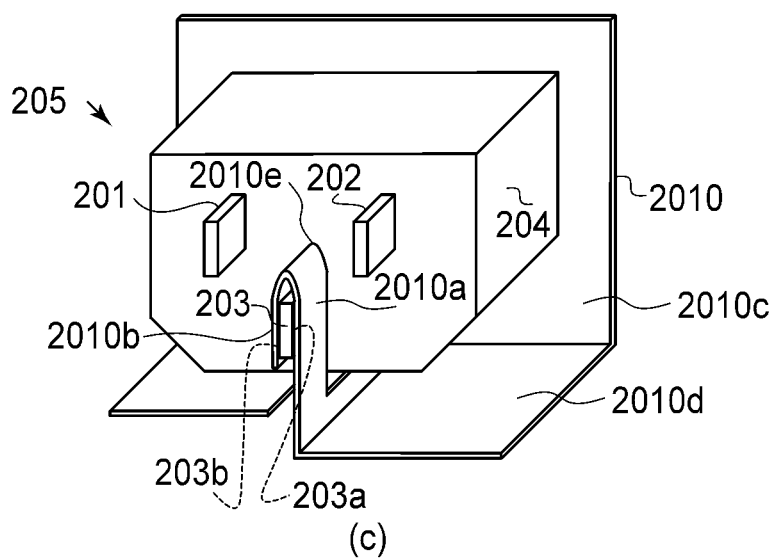

Parts (a) to (c) of FIG. 10 are schematic views each showing a structure of an inlet and a metal plate in a conventional example.

Figure 11:
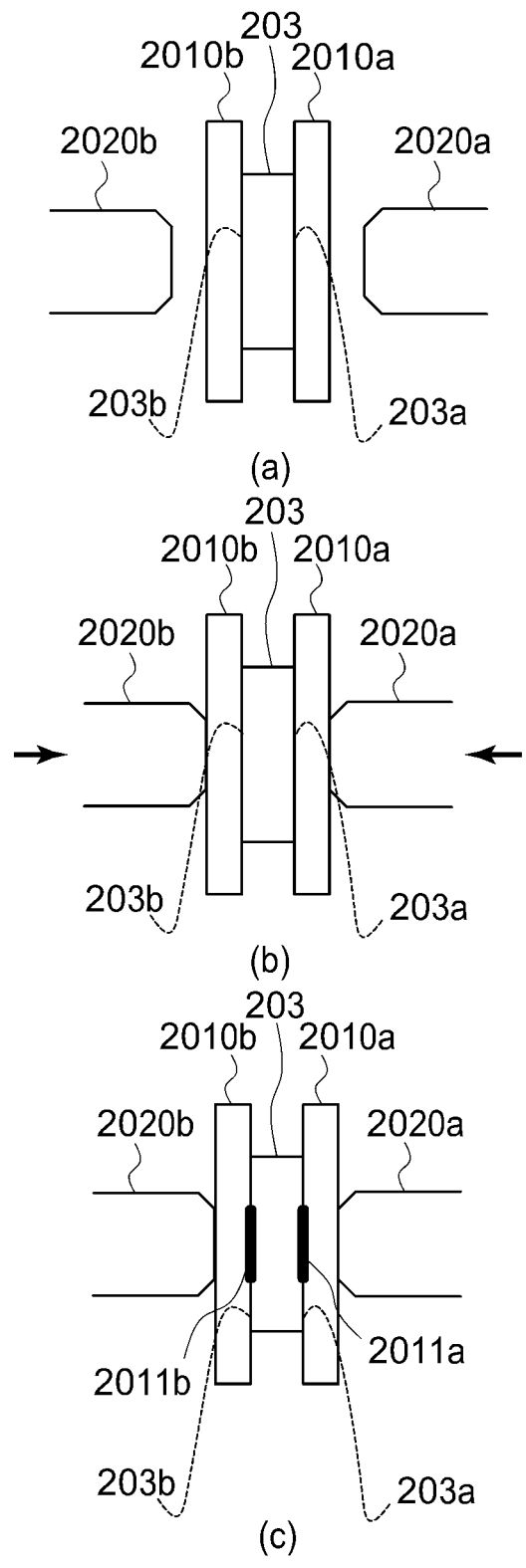

Parts (a) to (c) of FIG. 11 are schematic views showing a welding step of different metal materials in the conventional example.

Figure 12:
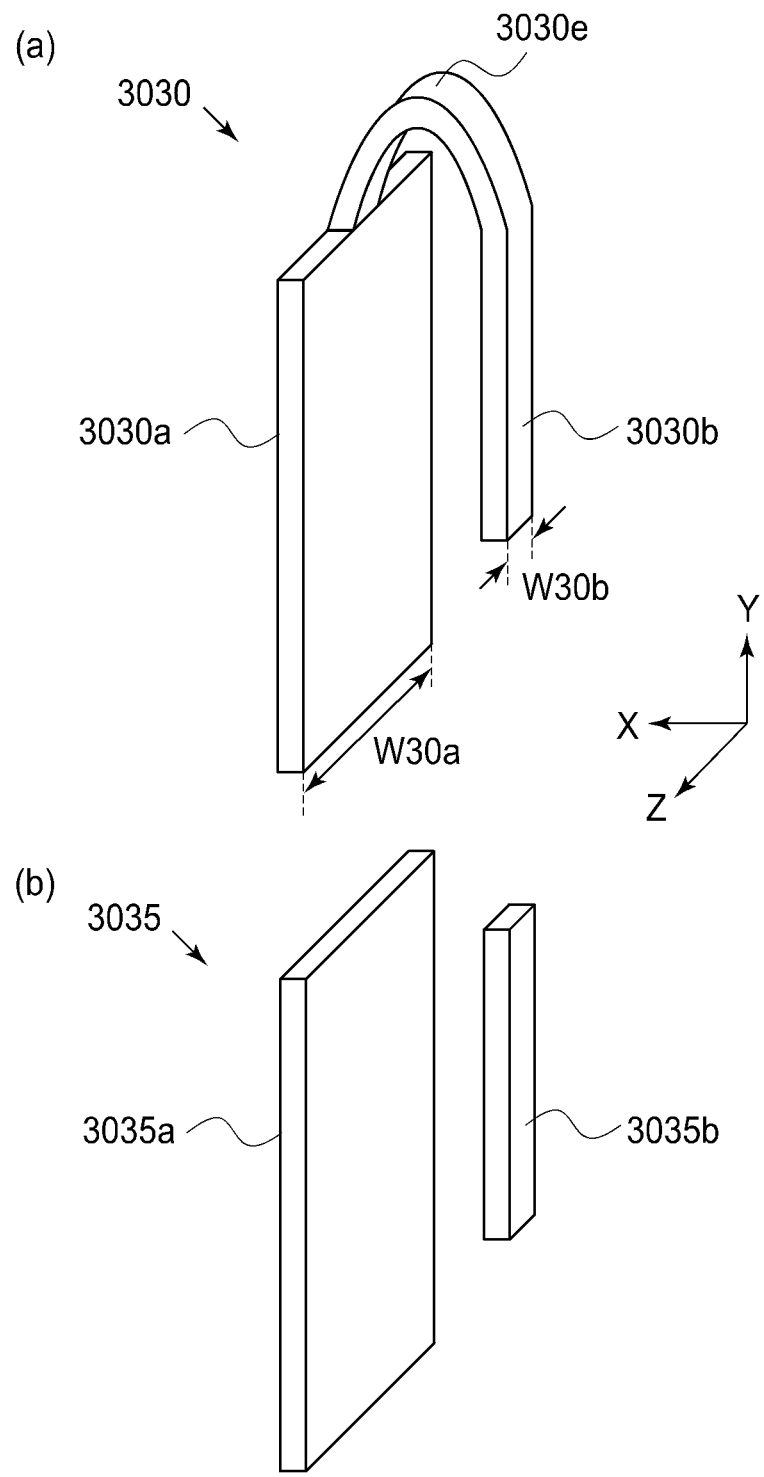

Parts (a) and (b) of FIG. 12 are schematic views each showing a structure of a metal plate in an embodiment 6.

Figure 13:
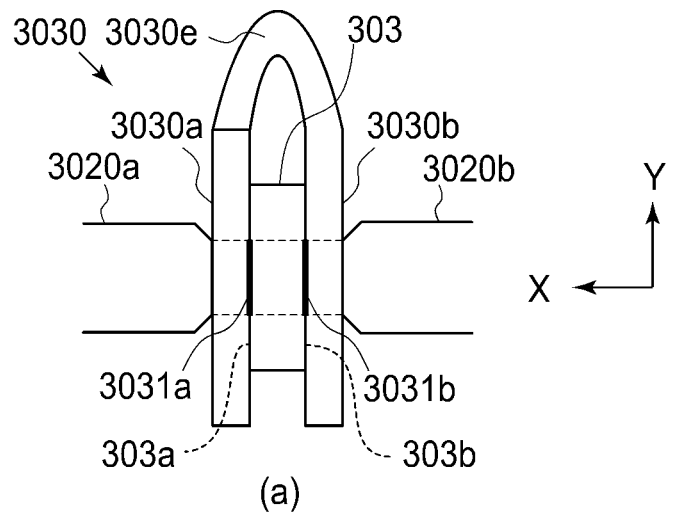
Figure 13:
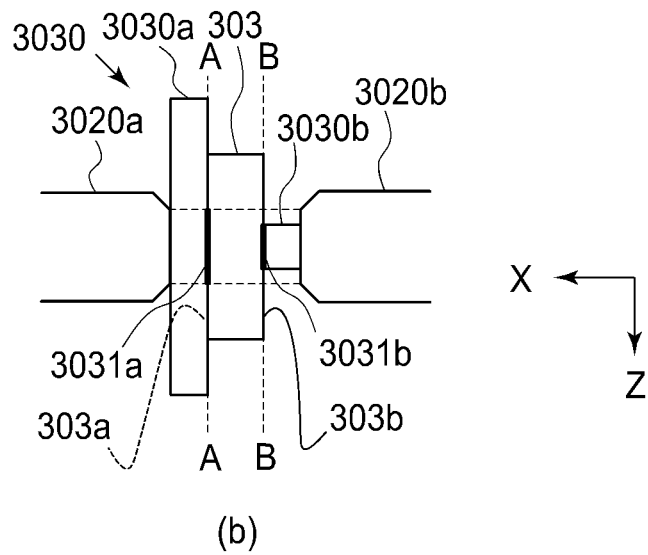
Figure 13:
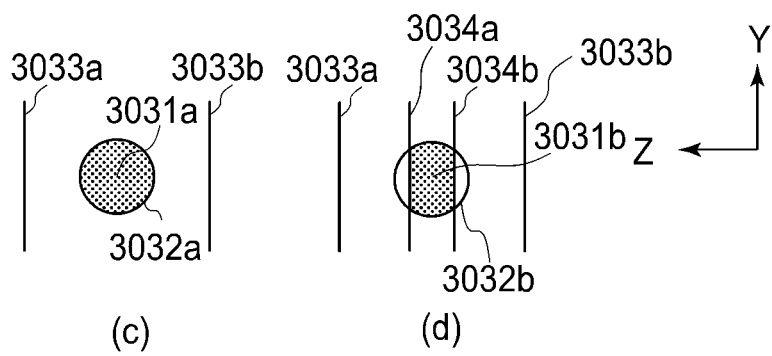

Parts (a) to (d) of FIG. 13 are schematic views each showing welding between the metal plate and a ground terminal in the embodiment 6.

Figure 14:
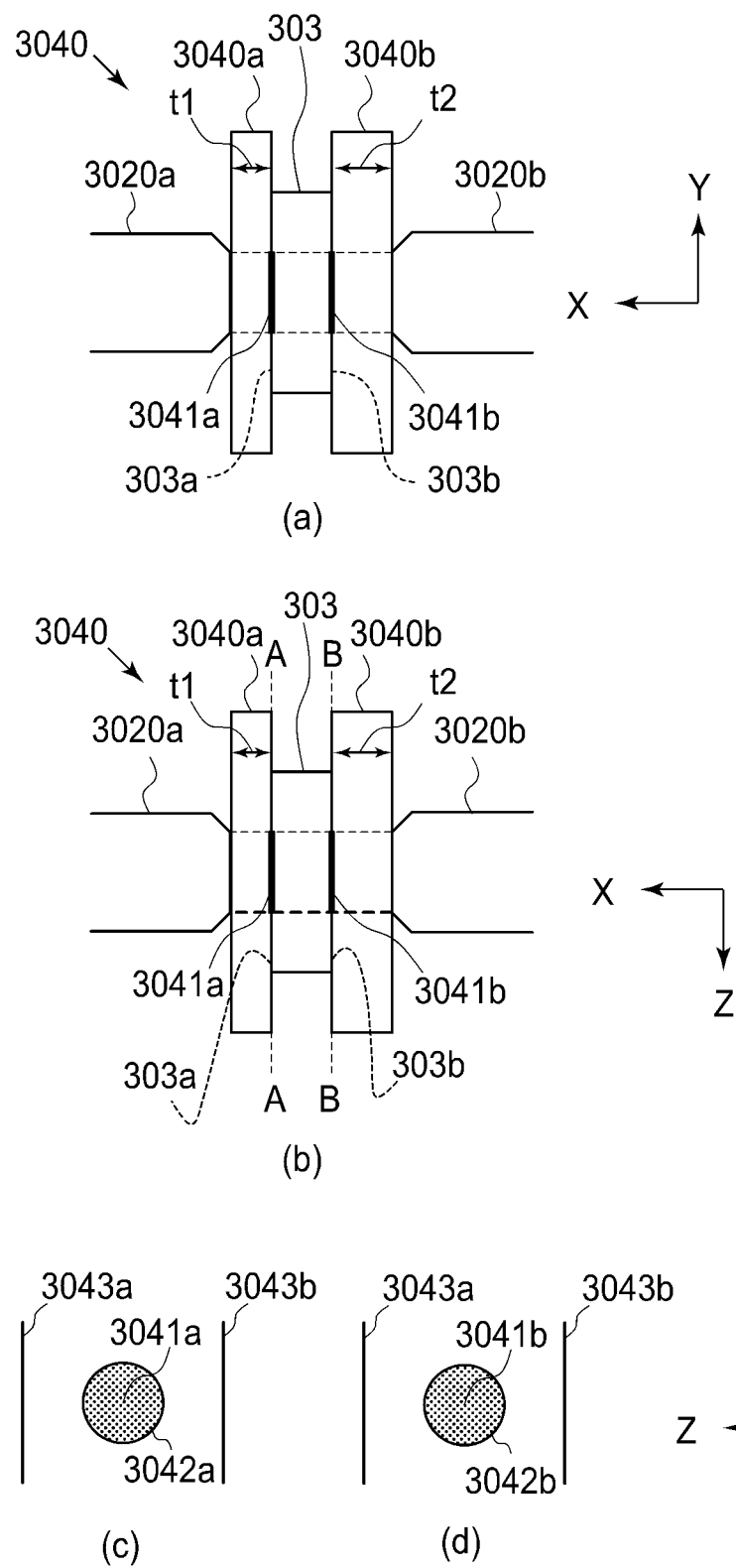

Parts (a) to (d) of FIG. 14 are schematic views each showing welding between a metal plate and a ground terminal in an embodiment 7.

Figure 15:
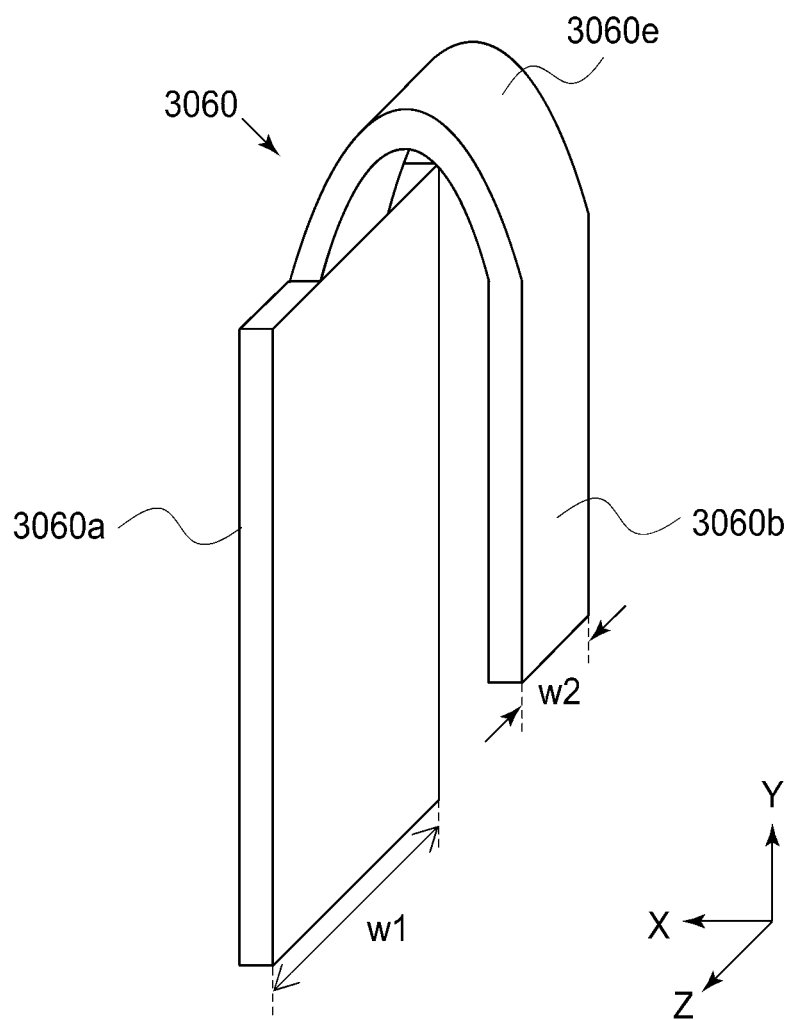

FIG. 15 is a schematic view showing a structure of a metal plate in an embodiment 8.

Figure 16:
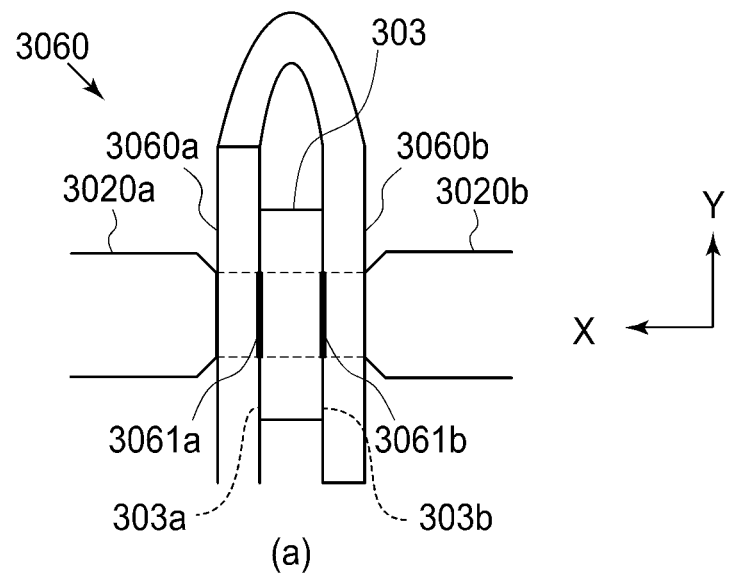
Figure 16:
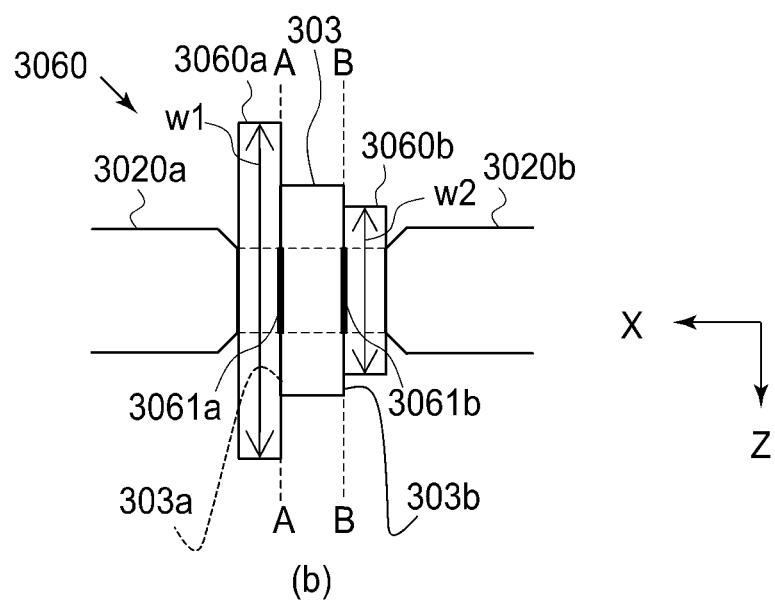
Figure 16:
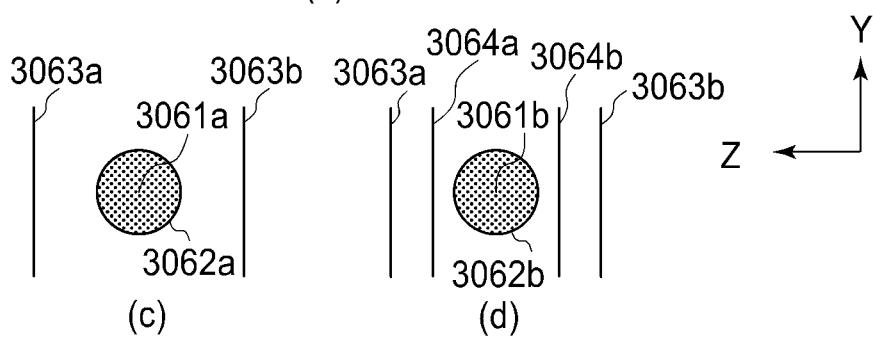

Parts (a) to (d) of FIG. 16 are schematic views each showing welding between the metal plate and a ground terminal in an embodiment 8.

Figure 17:
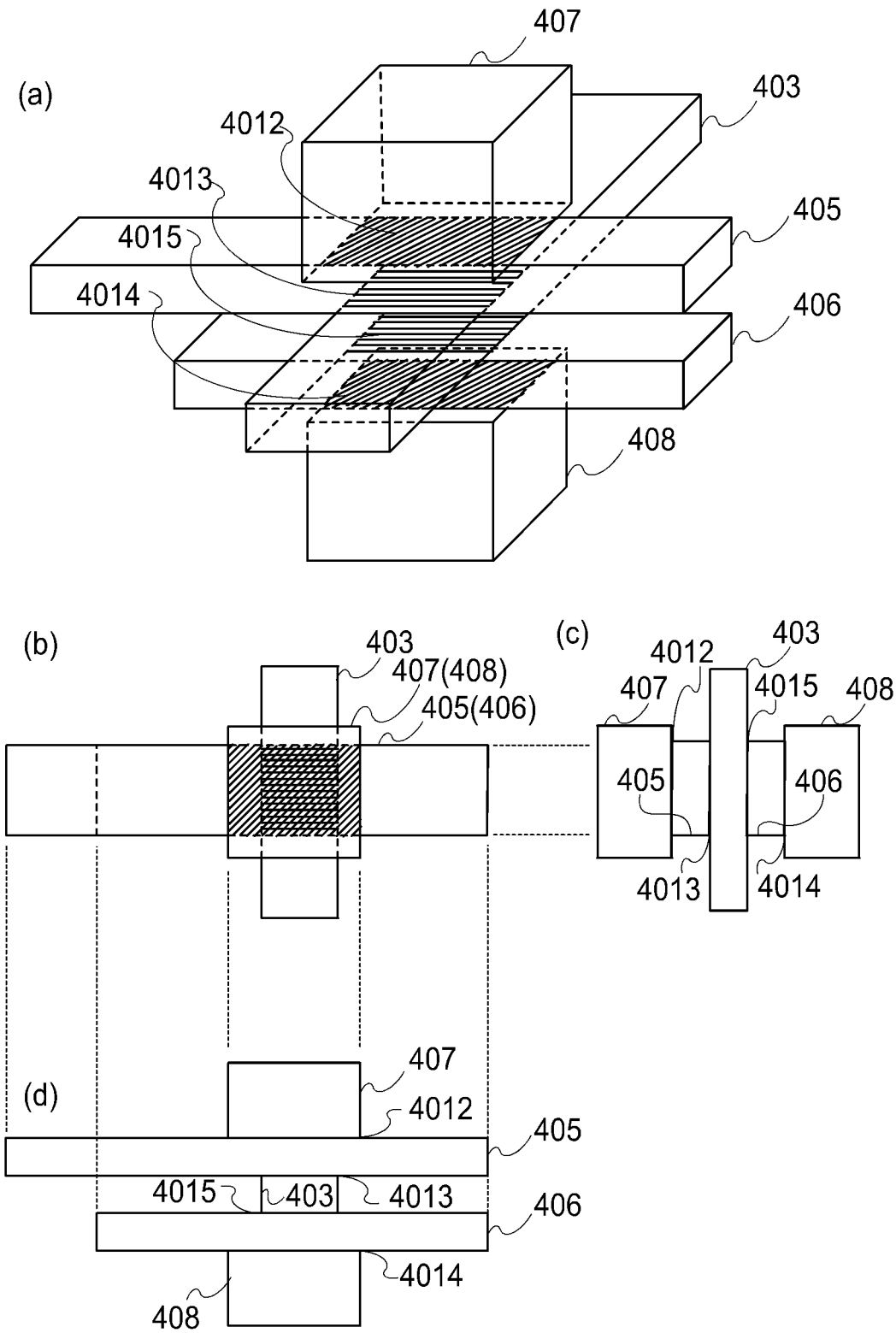

Parts (a) to (d) of FIG. 17 are schematic views for illustrating structures of an inlet metal plate and a ground terminal in an embodiment 9.

Figure 18:
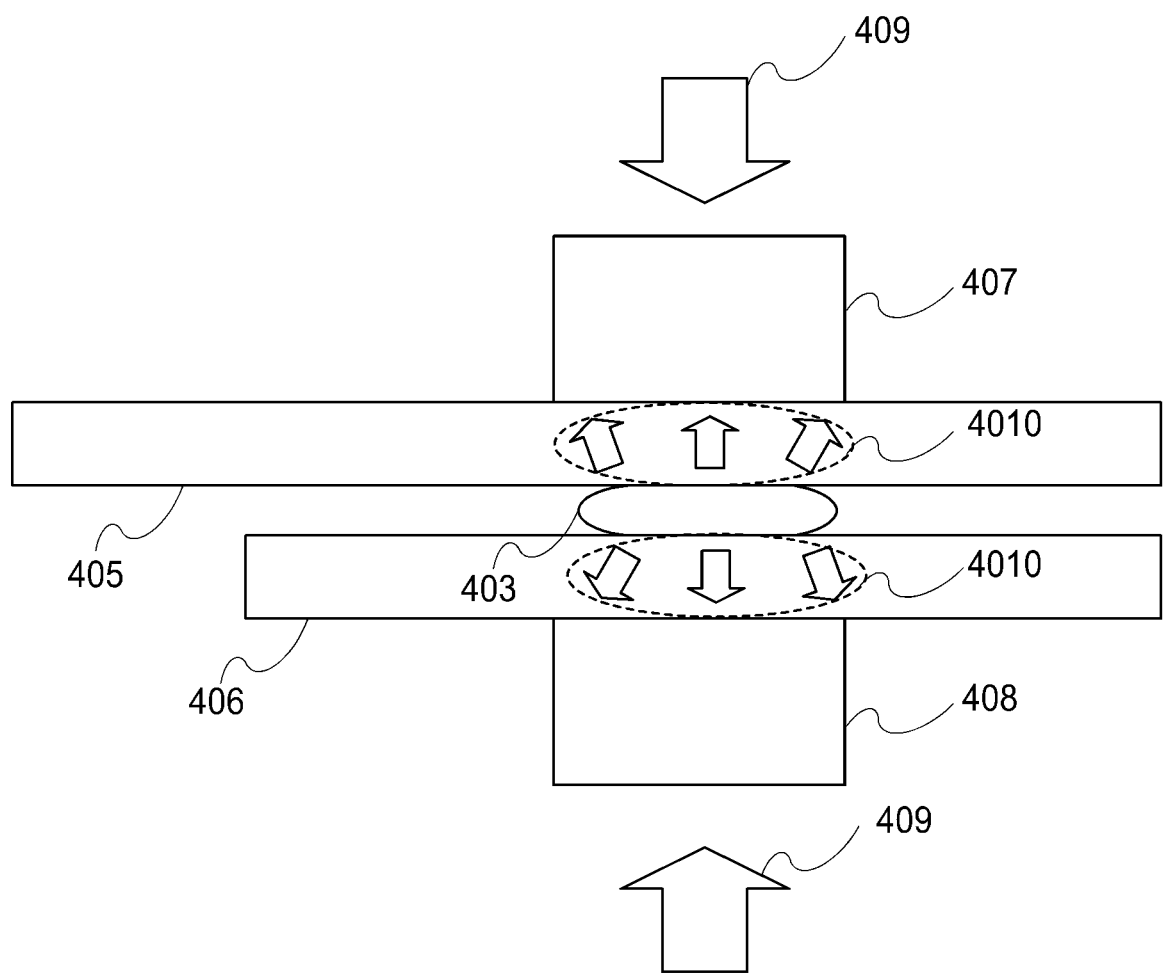

FIG. 18 is a schematic view for illustrating a mechanism for solving a problem in the embodiment 9.

Figure 19:
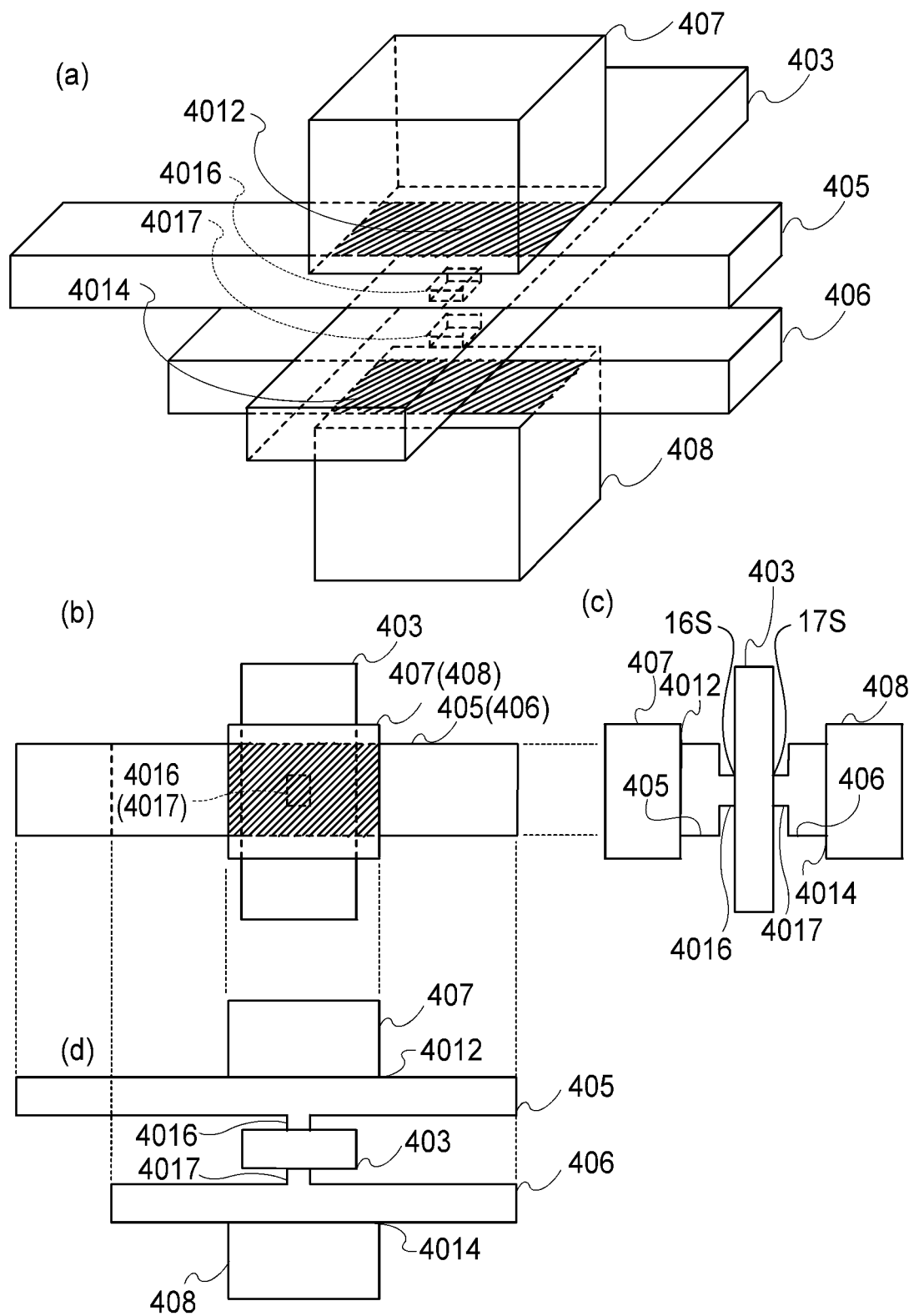

Parts (a) to (d) of FIG. 19 are schematic views for illustrating a structure of an inlet metal plate and a ground terminal in an embodiment 10.

Figure 20:
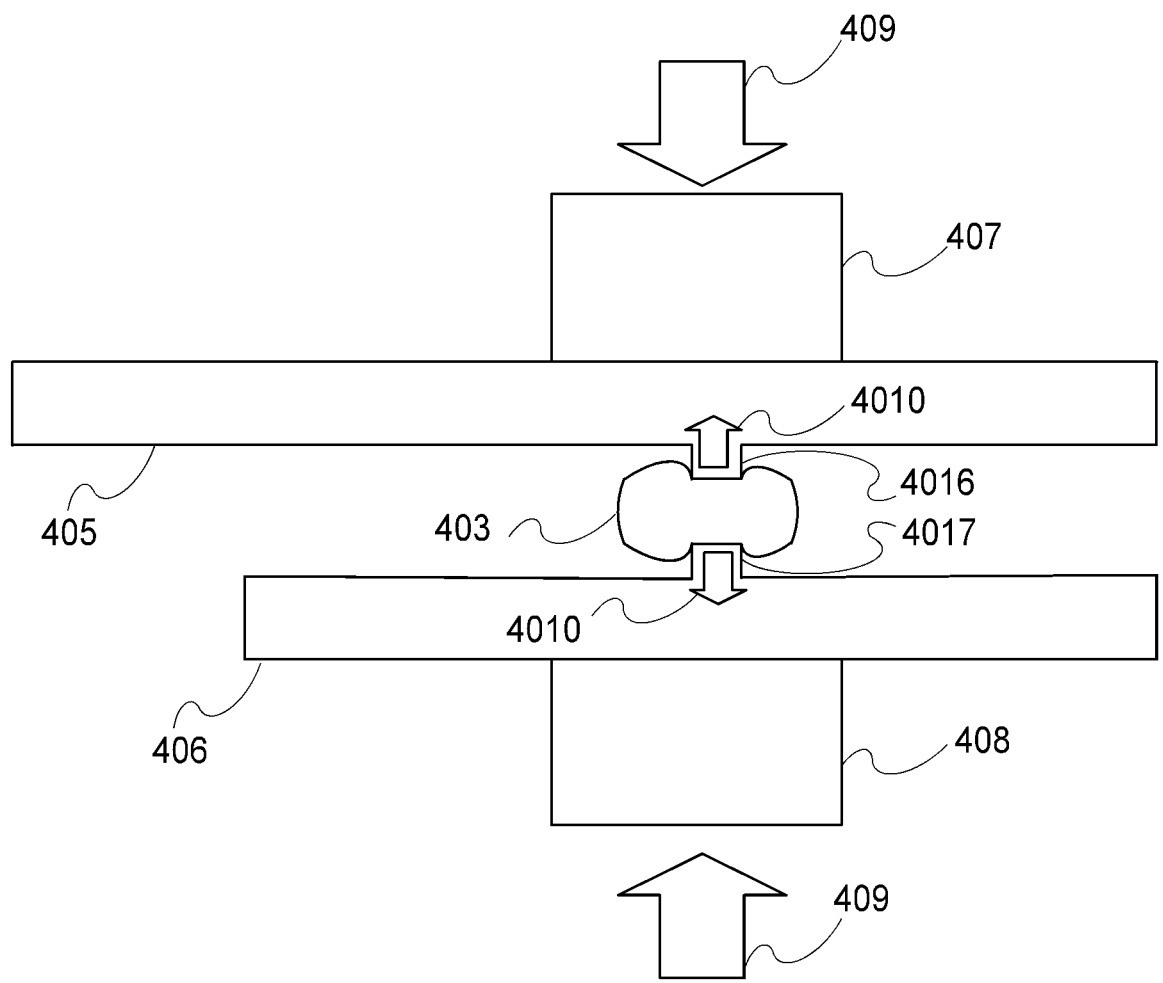

FIG. 20 is a schematic view for illustrating a mechanism for solving a problem in the embodiment 10.

Figure 21:
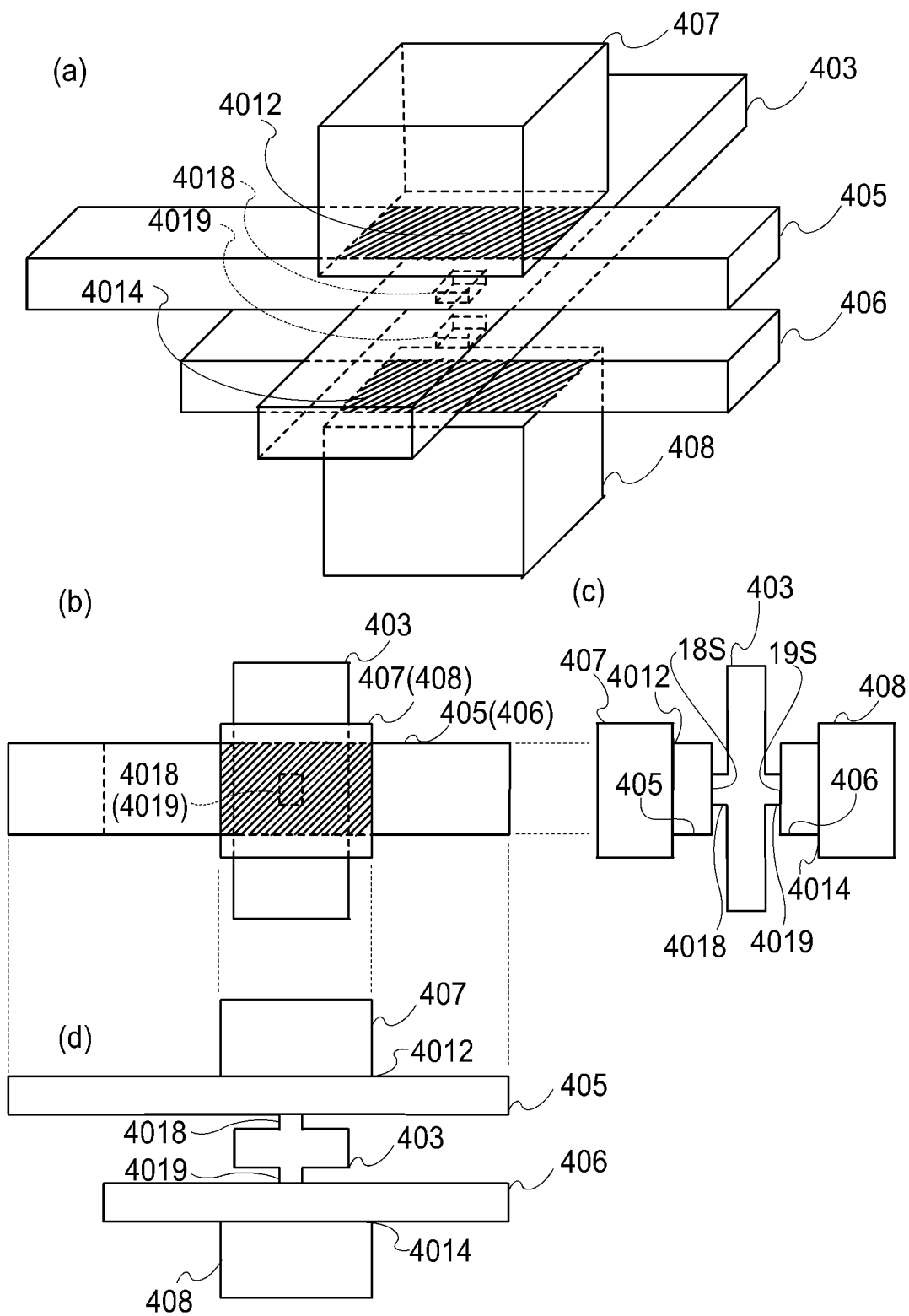

Parts (a) to (d) of FIG. 21 are schematic views for illustrating a structure of an inlet metal plate and a ground terminal in an embodiment 11.

Figure 22:
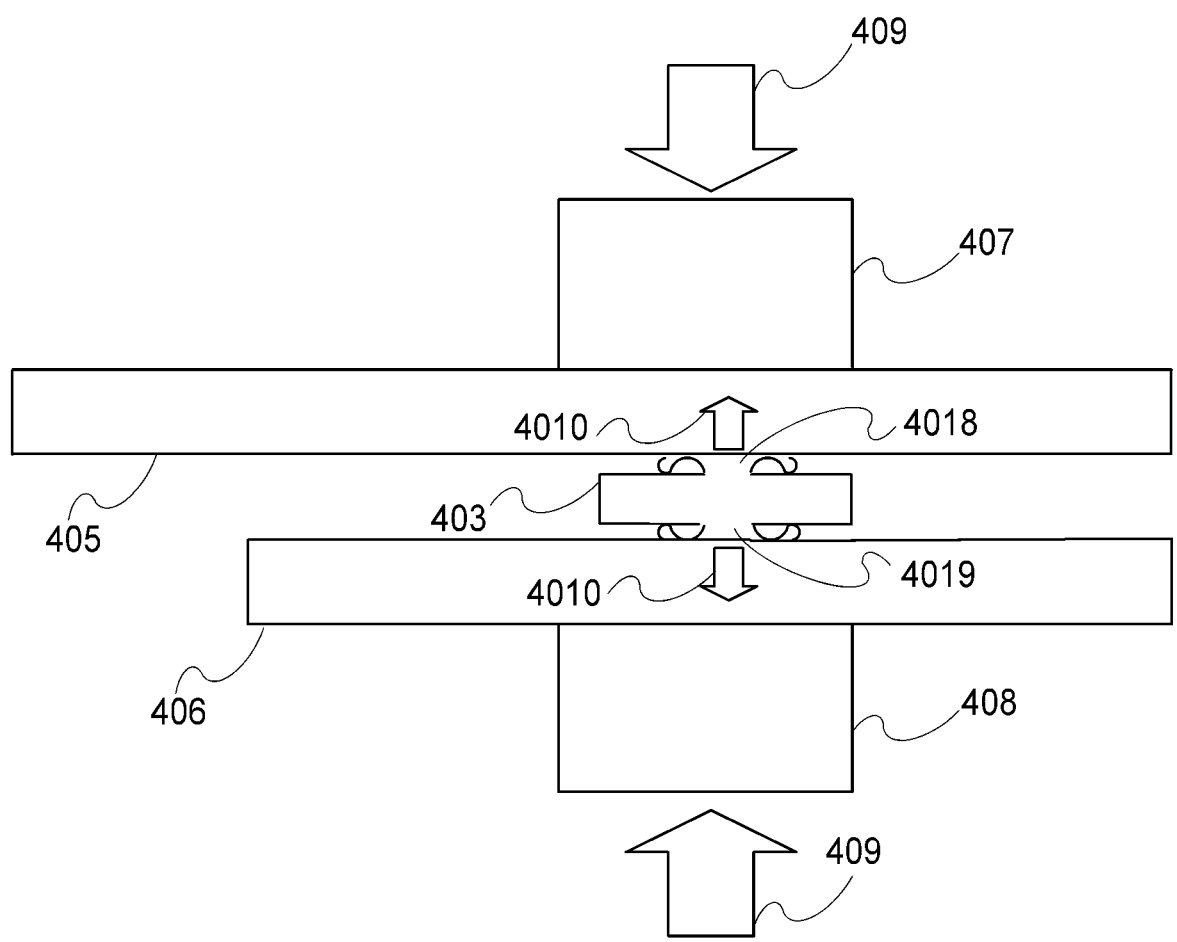

FIG. 22 is a schematic view for illustrating a mechanism for solving a problem in the embodiment 11.

Figure 23:
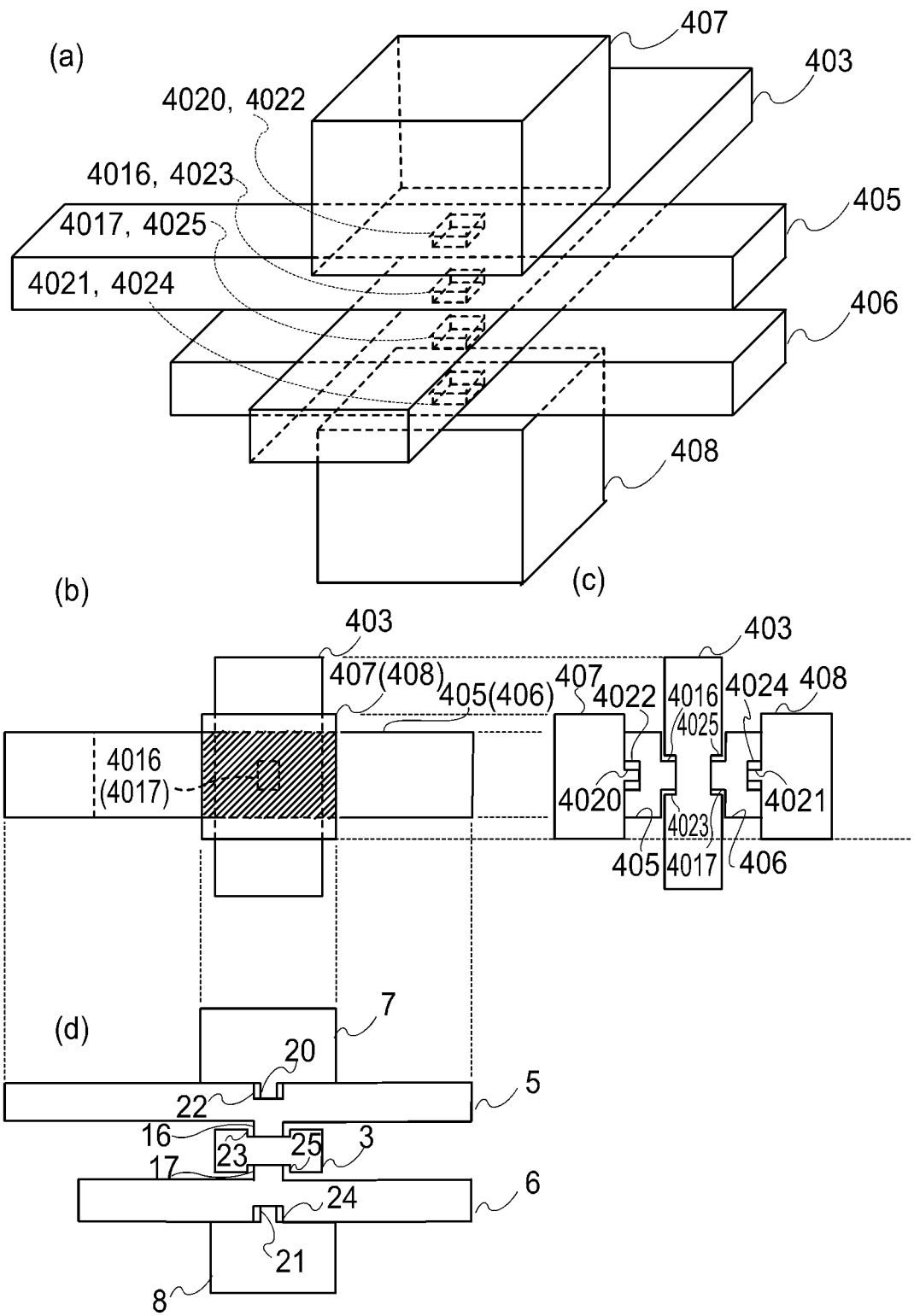

Parts (a) to (d) of FIG. 23 are schematic views for illustrating a structure of an inlet metal plate and a ground terminal in an embodiment 12.

Figure 24:
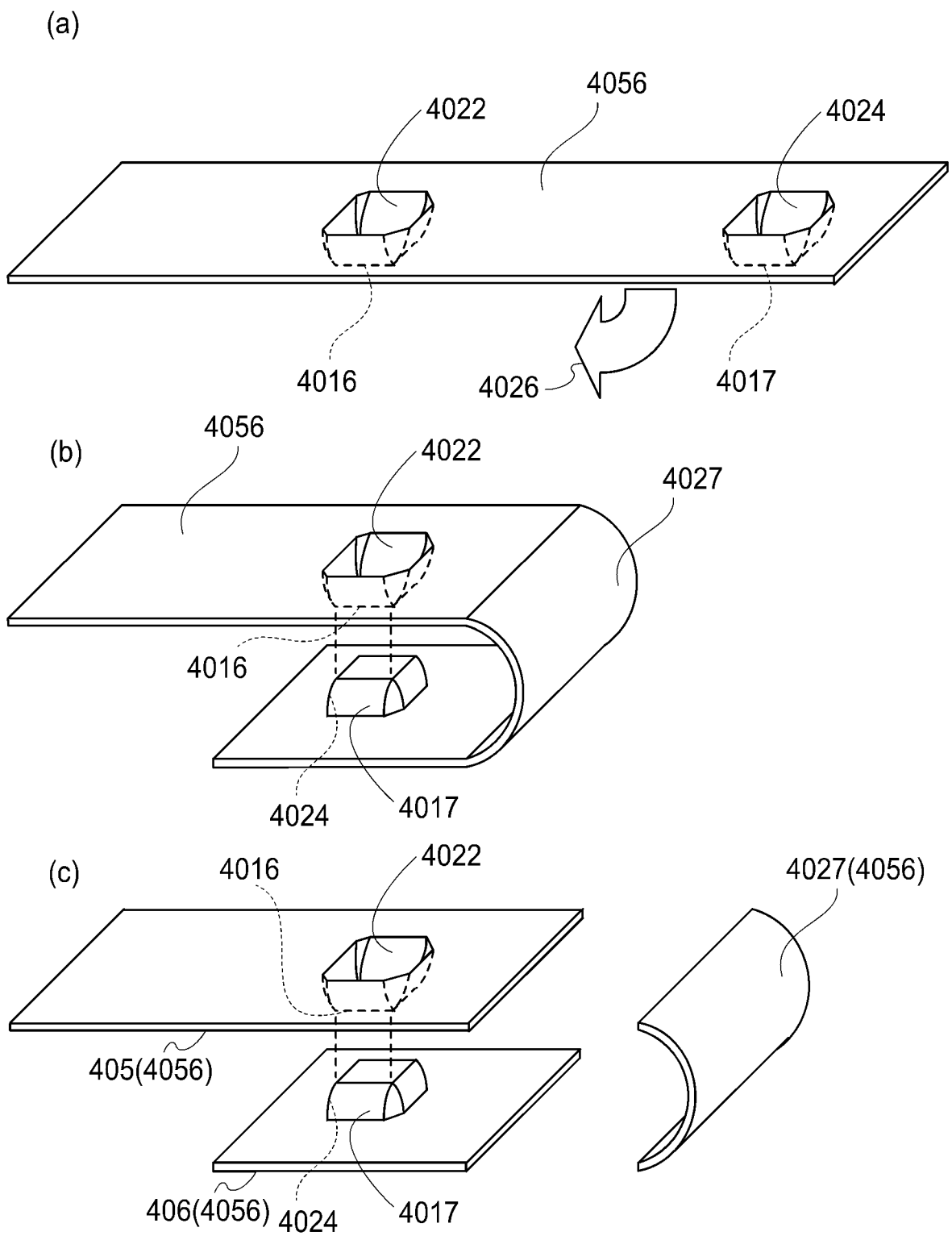

Parts (a) to (c) of FIG. 24 are schematic views for illustrating a specific structure in the embodiment 12.

Figure 25:
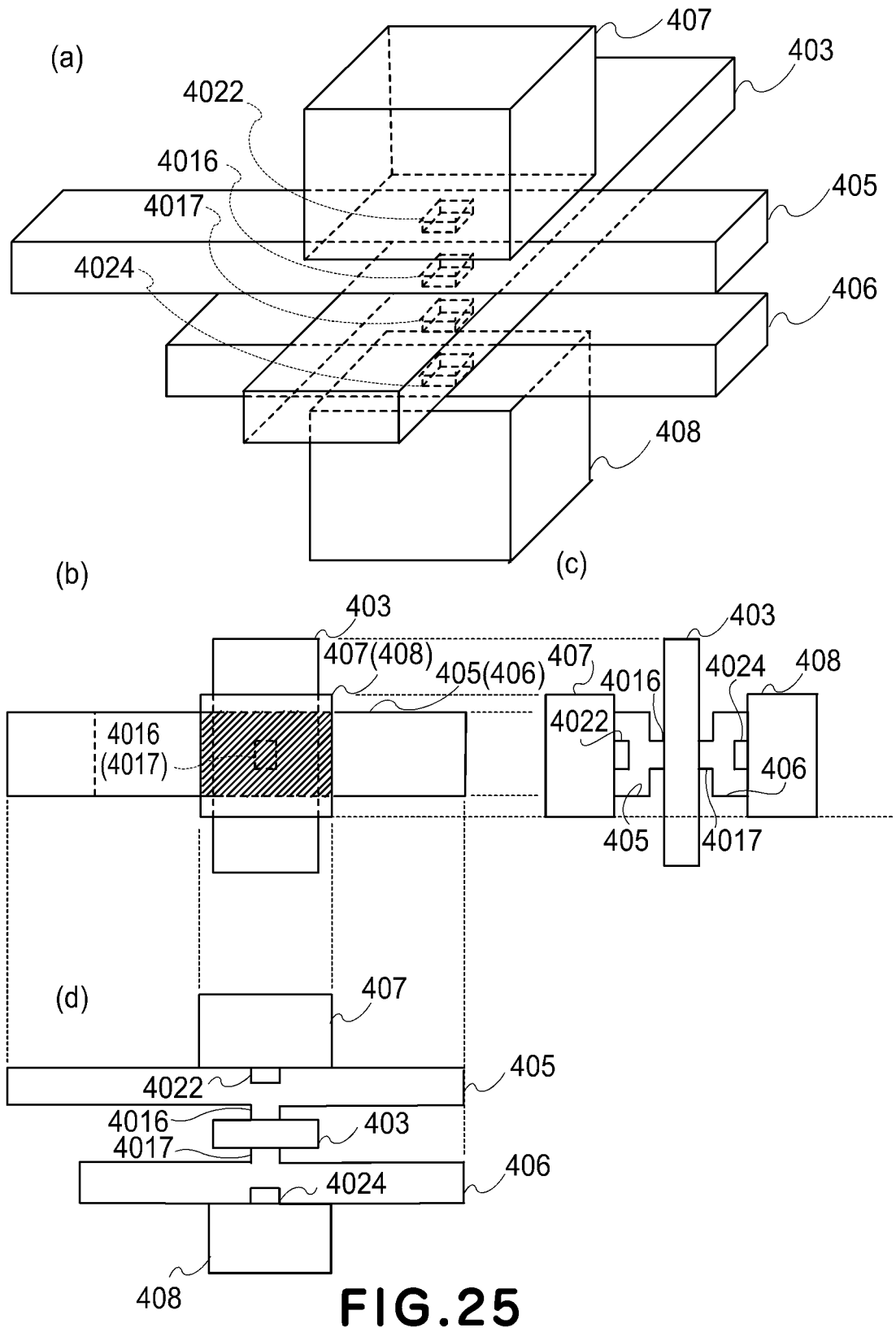

Parts (a) to (d) of FIG. 25 are schematic views for illustrating a structure of an inlet metal plate and a ground terminal in an embodiment 13.

Figure 26:
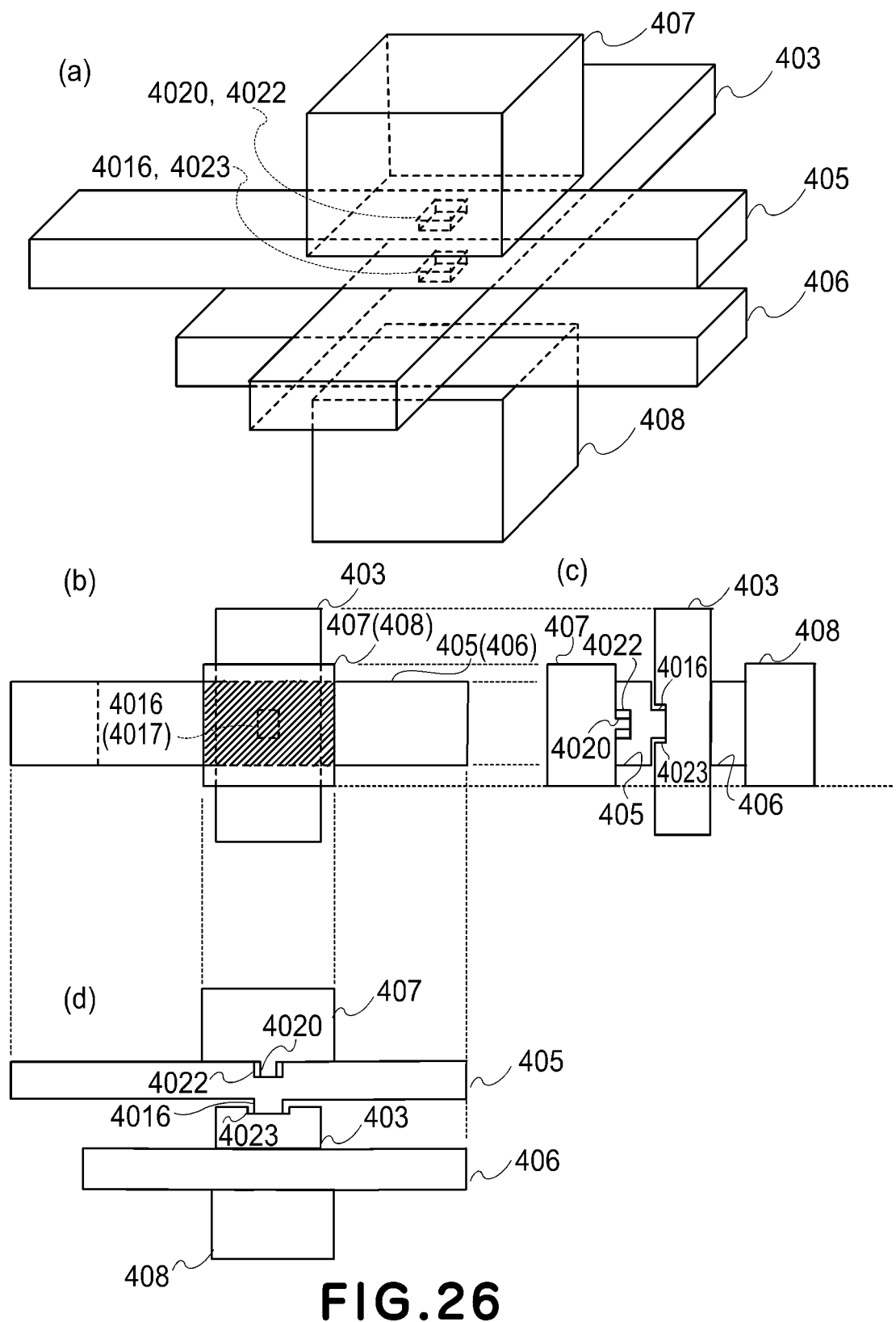

Parts (a) to (d) of FIG. 26 are schematic views for illustrating a structure of an inlet metal plate and a ground terminal in an embodiment 14.

Figure 27:
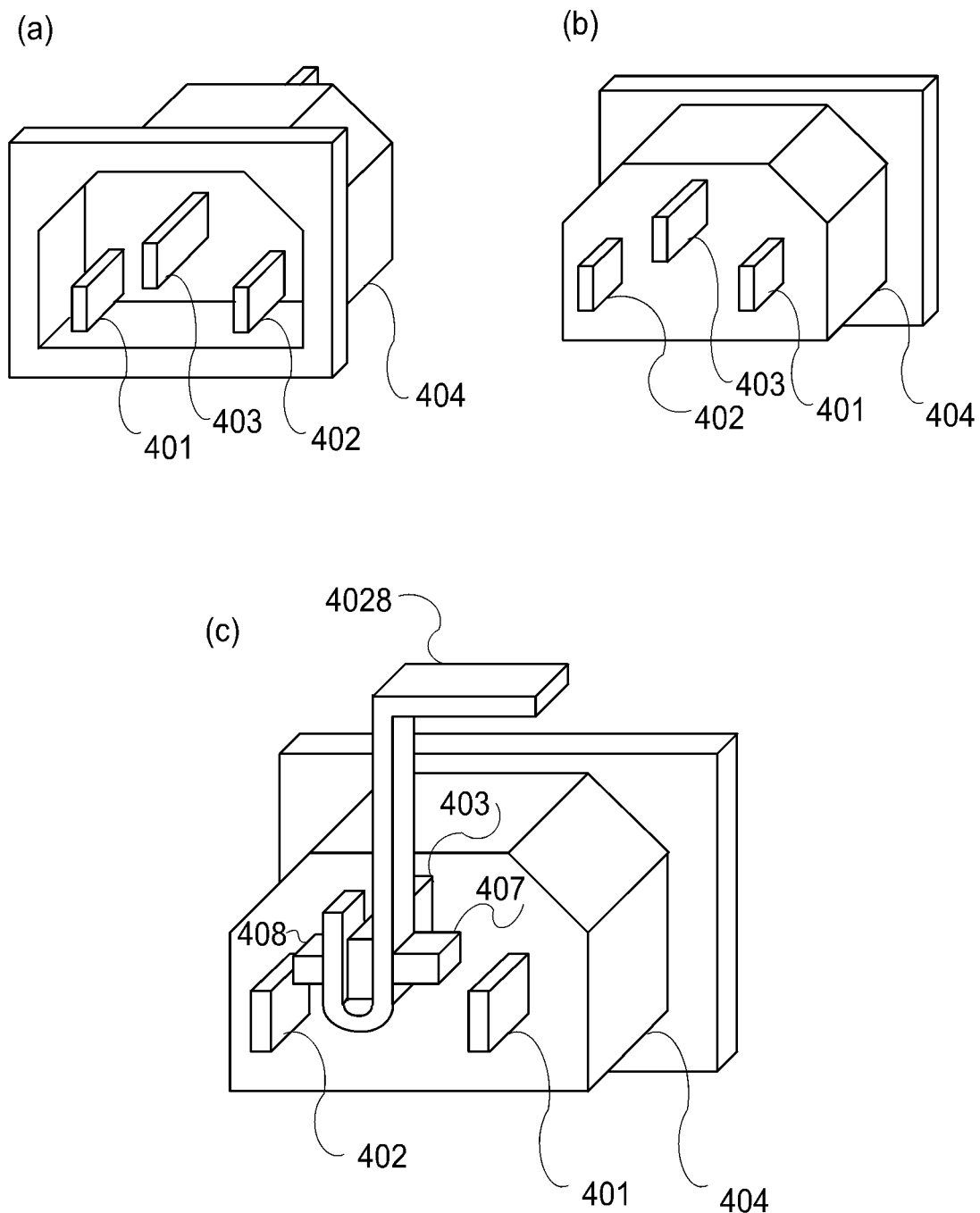

Parts (a) to (c) of FIG. 27 are schematic views for illustrating an inlet structure and a surface metal welding structure in a conventional example.

Figure 28:
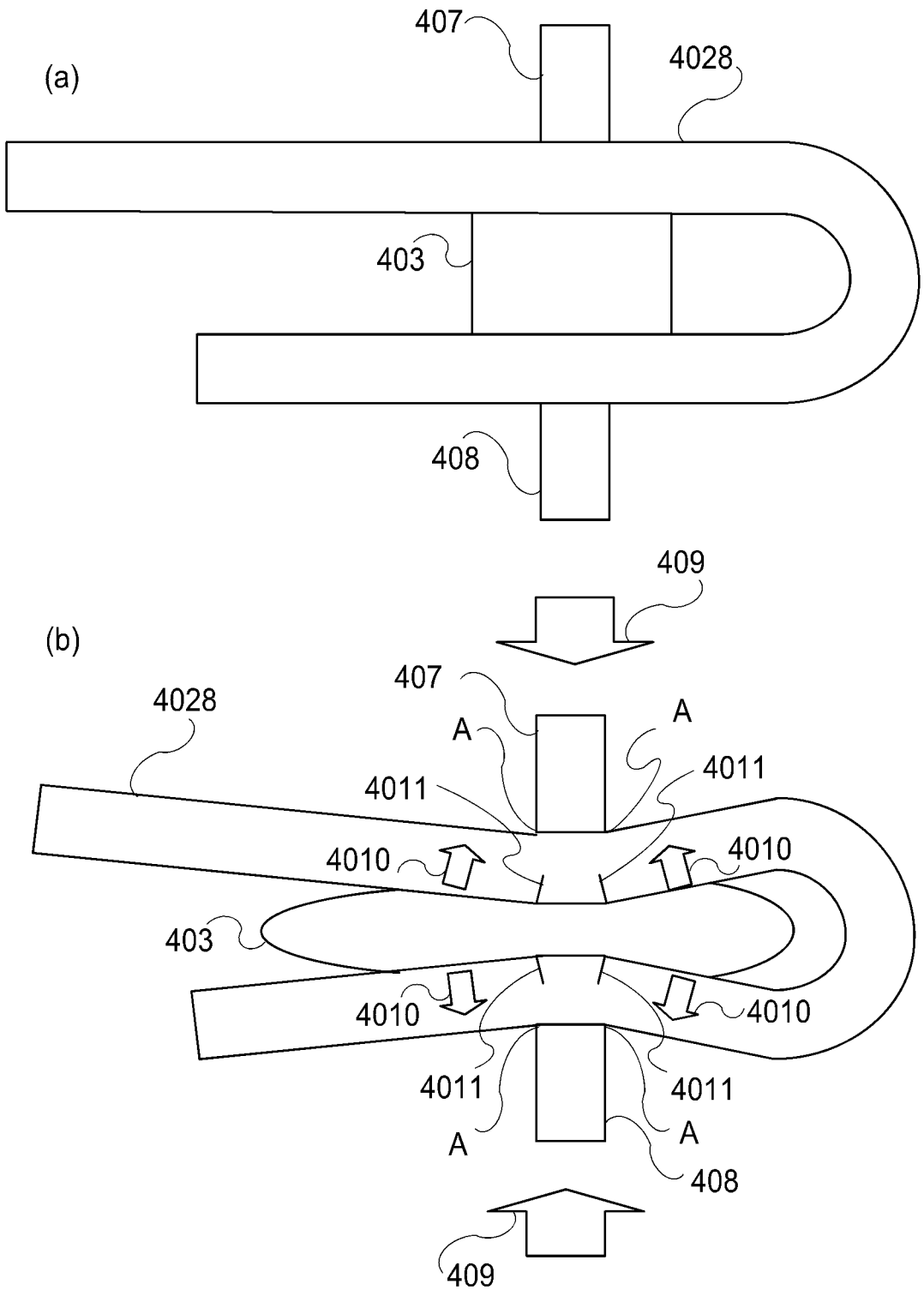

Parts (a) and (b) of FIG. 28 are schematic views for illustrating a problem occurring during welding of different metal materials in the conventional example.

Figure 29:
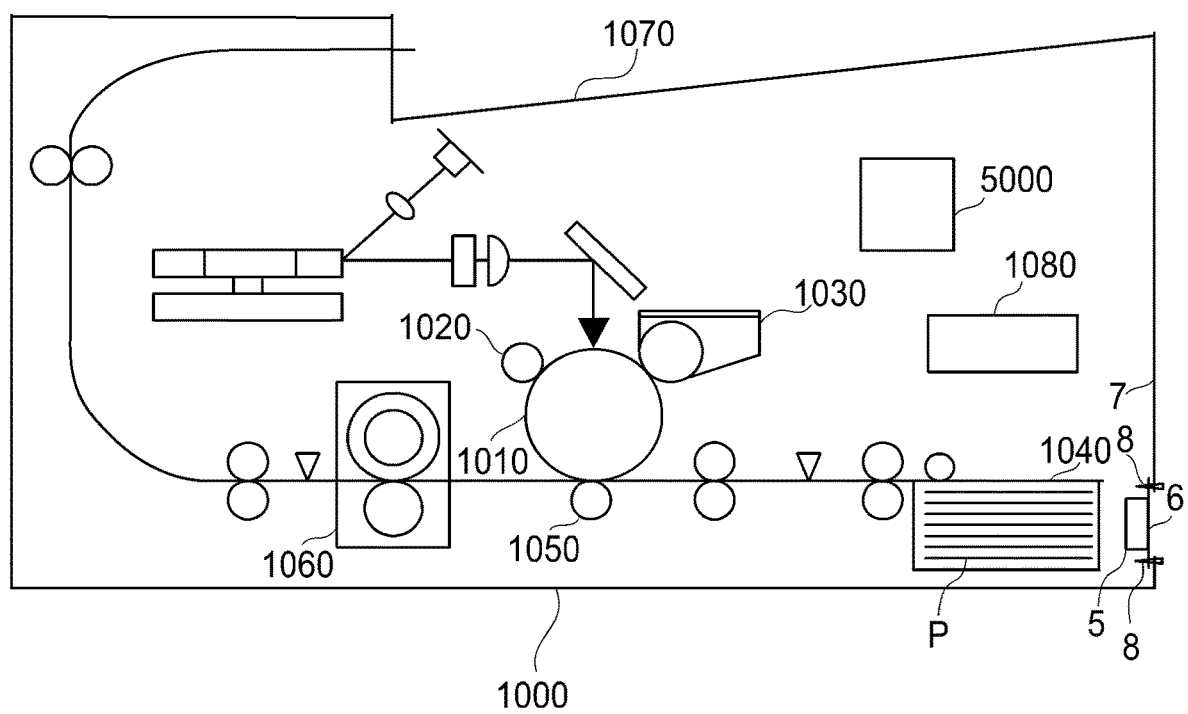

FIG. 29 is a schematic view showing a structure of an image forming apparatus as an electronic device of an embodiment 15.

Figure 30:
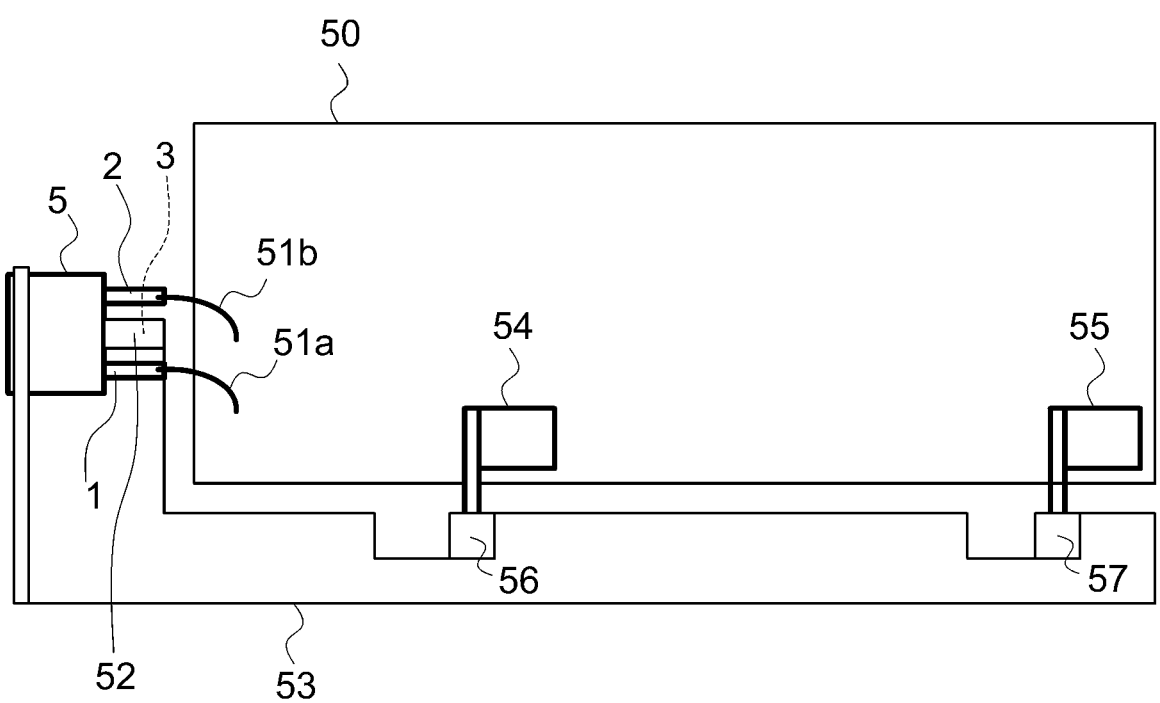

FIG. 30 is a schematic view showing structures of an inlet, a metal plate and a substrate in the embodiment 15.

Figure 31:
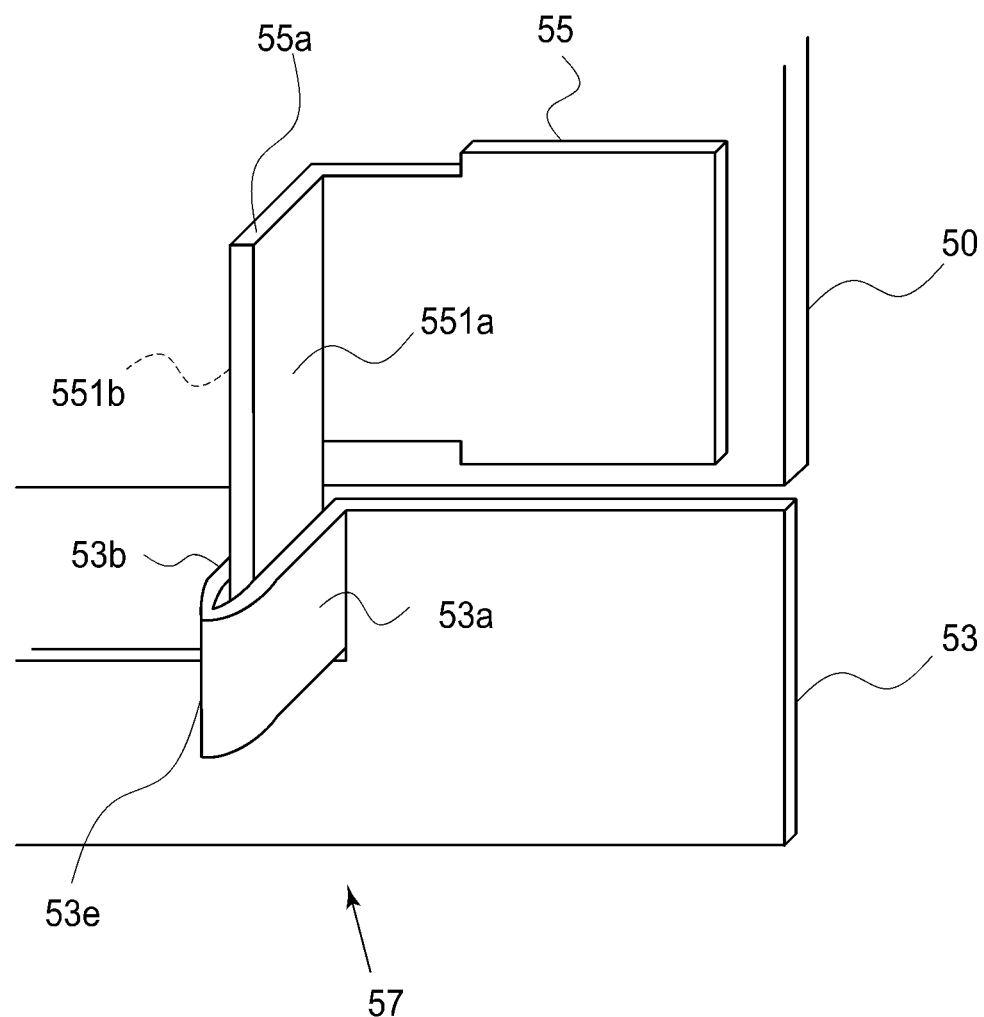

FIG. 31 is a schematic view showing structures of the metal plate and a ground terminal in the embodiment 15.

DESCRIPTION OF THE EMBODIMENTS

In the following, embodiments for carrying out the present invention will be specifically while making reference to the drawings.

Embodiment 1

A joint (welding) structure between a ground terminal (grounding terminal) of an AC inlet and a casing metal plate of an electronic device will be described while making reference to the drawings. In an embodiment 1, a constitution in which in joint between the ground terminal of the AC inlet and the casing metal plate of the electronic device, wear (abrasion) of electrodes due to reaction of tin plating on a surface of the ground terminal of the AC inlet with copper which is a material of the electrodes is reduced and thus productivity is improved will be described.

[Connection between Ground Terminal of AC Inlet and Casing Metal Plate of Electronic Device]

Figure 1:
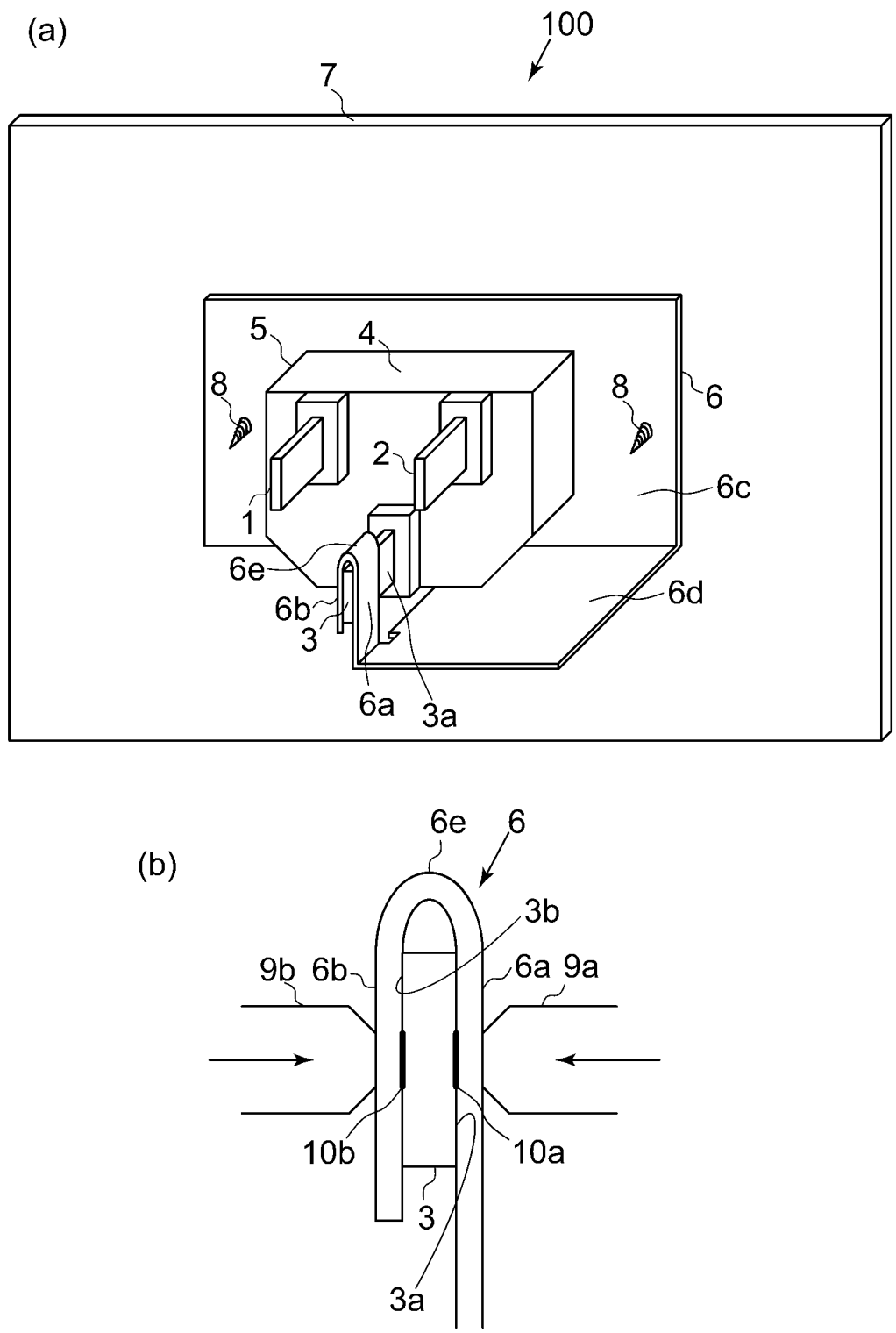

Part (a) of FIG. 1 is a schematic view illustrating structures of an AC inlet 5 and a casing metal plate 7 of an electronic device 100. A front side of FIG. 1 is an inside of the electronic device 100. The AC inlet 5 includes a live terminal 1, a neutral terminal 2, a ground terminal (earth terminal) 3, and a mold portion 4. The ground terminal 3 is constituted by a tin-plated copper-based material. The mold portion 4 is a member for holding and fixing the live terminal 1 and the neutral terminal 2 and the ground terminal 3. The electronic device 100 includes a first casing metal plate 6 and a casing metal plate 7. The casing metal plate 6 also functions as a member for holding the AC inlet 5. The casing metal plate 7 is a metal plate constituted as a separate member from the casing metal plate 6, and is fastened by the casing metal plate 6 and screws 8. That is, the casing metal plate 6 and the casing metal plate 7 are also in an electrically joined state.

The casing metal plate 6 is constituted by a zinc-plated steel plate. The casing metal plate 6 includes a first portion 6a made of a first metal material, a second portion 6b made of a second metal material, a portion 6c holding the mold portion 4 of the AC inlet 5, and a portion 6d joining the portion 6c with the first and second portions 6a and 6b. Incidentally, in the embodiment 1, the first portion 6a and the second portion 6b are integrally formed, and the casing metal plate 6 also functions as a second casing metal plate.

Part (b) of FIG. 1 is a schematic view showing a state during welding (joint) between the ground terminal 3 of the AC inlet and the casing metal plate 6 and is an enlarged view of a principal part showing a joining portion (welding portion) between the ground terminal 3 and the casing metal plate 6 as viewed from the front side of part (a) of FIG. 1. A first electrode 9a and a second electrode 9b are a pair of electrodes for causing a current to flow through an object by applying a pressing force to the object. When the ground terminal 3 and the casing metal plate 6 are joined to each other, the ground terminal 3 and the casing metal plate 6 are sandwiched between the electrode 9a and the electrode 9b, and then a predetermined pressing force is applied to between the electrodes 9a and 9b, so that the current is caused to flow through the electrodes 9a and 9b. At this time, as shown in part (a) of FIG. 1, a position where the casing metal plate 6 sandwiches the ground terminal 3 is a position distance from the mold portion by a predetermined distance on a free end side (the other end side) of the ground terminal 3. A portion of a diffusion joint utilizing diffusion of atoms on a joining surface) between the ground terminal 3 of the AC inlet 5 and a first portion 6a is referred to as a joining portion 10a. A portion of diffusion joint between the ground terminal 3 of the AC inlet 5 and a second portion 6b is referred to as a joining portion 10b.

In the embodiment 1, the first portion 6a and the second portion 6b are constituted integrally with the casing metal plate 6 of the electronic device 100. Specifically, the portion 6d of the casing metal plate 6 continuously extends from a portion 6c toward a free end (end portion opposite from the mold portion 4) of the ground terminal 3 while avoiding the AC inlet 5. The first portion 6a is continuous to a portion 6d and contacts a first surface 3a of the ground terminal 3. The second portion 6b is continuous to the first portion 6a via a bent portion 6e and contacts a second surface 3b of the ground terminal 3 opposite from the first surface 3a. Thus, the first portion 6e and the second portion 6b are constituted integrally with the casing metal plate 6 (specifically the portion 6c). Further, the casing metal plate 6 of the electronic device 100, specifically the first portion 6a and the second portion 6b are disposed so as to sandwich the ground terminal 3 of the AC inlet 5.

Further, the pair of electrodes 9a and 9b is disposed so as to contact the first portion 6a and the second portion 6b, respectively, and the current is caused to flow through between the electrodes 9a and 9b while applying the pressing forces in arrow directions in part (b) of FIG. 1. That is, a constitution in which the electrodes 9a and 9b do not contact the ground terminal 3 is employed. By this, each of a contact surface between the surface 3a of the ground terminal 3 of the AC inlet 5 and the first portion 6a and a contact surface between the surface 3b of the ground terminal 3 of the AC inlet 5 and the second portion 6b generates heat. As a result, the joining portion 10a and the joining portion 10b which are formed by diffusion joint are provided (joining step). The diffusion joint is one of welding methods of different metal materials, in which the different metal materials are contacted and joined to each other and are heated to a temperature not more than a melting point in that (contact) state, so that diffusion of atoms is carried out. The diffusion joint is based on mutual diffusion of the atoms, and therefore, in joint, a state of the contact surface of metals to be joined in an important requirement. Specifically, it is important that an oxide and another contaminant do not exist on the contact surface.

In the embodiment 1, the ground terminal 3 of the AC inlet 5 is tin-plated. On the other hand, the first portion 6a and the second portion 6b of the casing metal plate 6 of the electronic device 100 is zinc-plated. The pressing energization is carried out by the pair of electrodes 9a and 9b, so that the contact surface between the surface 3a of the ground terminal 3 of the AC inlet 5 and the first portion 6a and the contact surface between the surface 3b of the ground terminal 3 of the AC inlet 5 and the second portion 6 generate heat. Then, a temperature of timing of the surface of the ground terminal 3 of the AC inlet 5 and a temperature of zincing (galvanizing) of the surface of each of the first portion 6a and the second portion 6b reach melting points of the timing and the zincing and thus these plated metal materials melt. When these plated metal materials are melted, the oxides and the contaminants on the surfaces are included in a melt. Then, by pressing with the electrodes 9a and 9b, the melt is extruded to the outside from the contact surface between the surface 3a of the ground terminal 3 of the AC inlet 5 and the first portion 6a and the contact surface between the surface 3b of the ground terminal 3 of the AC inlet 5 and the second portion 6b. Thus, at a portion where a cleaned surface of copper of the ground terminal 3 of the AC inlet 5, which comes to the surface by the melting of the tin plating and a cleaned surface of iron of the first and second portions 6a and 6b which comes to the surface by the melting of the zinc plating, the diffusion joint between the different metal materials is carried out.

Thus, a constitution in which the ground terminal 3 of the AC inlet 5 is sandwiched by the casing metal plate 6 of the electronic device 100 and then the pressing energization by the pair of electrodes 9a and 9b is carried out is employed. By this, it is possible to join the ground terminal 3 of the AC inlet 5 and the first and second portions 6a and 6b of the casing metal plate 6 to each other without bringing the pair of electrodes 9a and 9b and the ground terminal 3 of the AC inlet 5 into contact with each other. For that reason, wearing (abrasion) of the electrodes 9a and 9b due to reaction of the copper which is the material of the electrodes 9a and 9b with the tin plating of the surface of the ground terminal 3 of the AC inlet 5 is prevented, and therefore, a frequency of polishing and an exchanging operation of the electrodes 9a and 9b is reduced and thus productivity can be improved.

The casing metal plate 6 of the electronic device 100 to which the ground terminal 3 of the AC inlet 5 is joined by the joint structure of part (b) of FIG. 1 is fastened to the casing metal plate 7, which is a separate member from the casing metal plate 6, by the two screws 8. By this, also in the casing metal plate 7 which is the separate member from the casing metal plate 6 of the electronic device 100, it is possible to ensure electrical joint with the ground terminal 3 of the AC inlet 5 through the casing metal plate 6 of the electronic device 100. Incidentally, in FIG. 1, the case where the first portion 6a made of the first metal material and the second portion 6b made of the second metal material are constituted integrally was described. However, the first portion 6a and the second portion 6b may also be constituted by separate members.

[Case that First Portion and Second Portion are Constituted by Separate Members]

Figure 2:
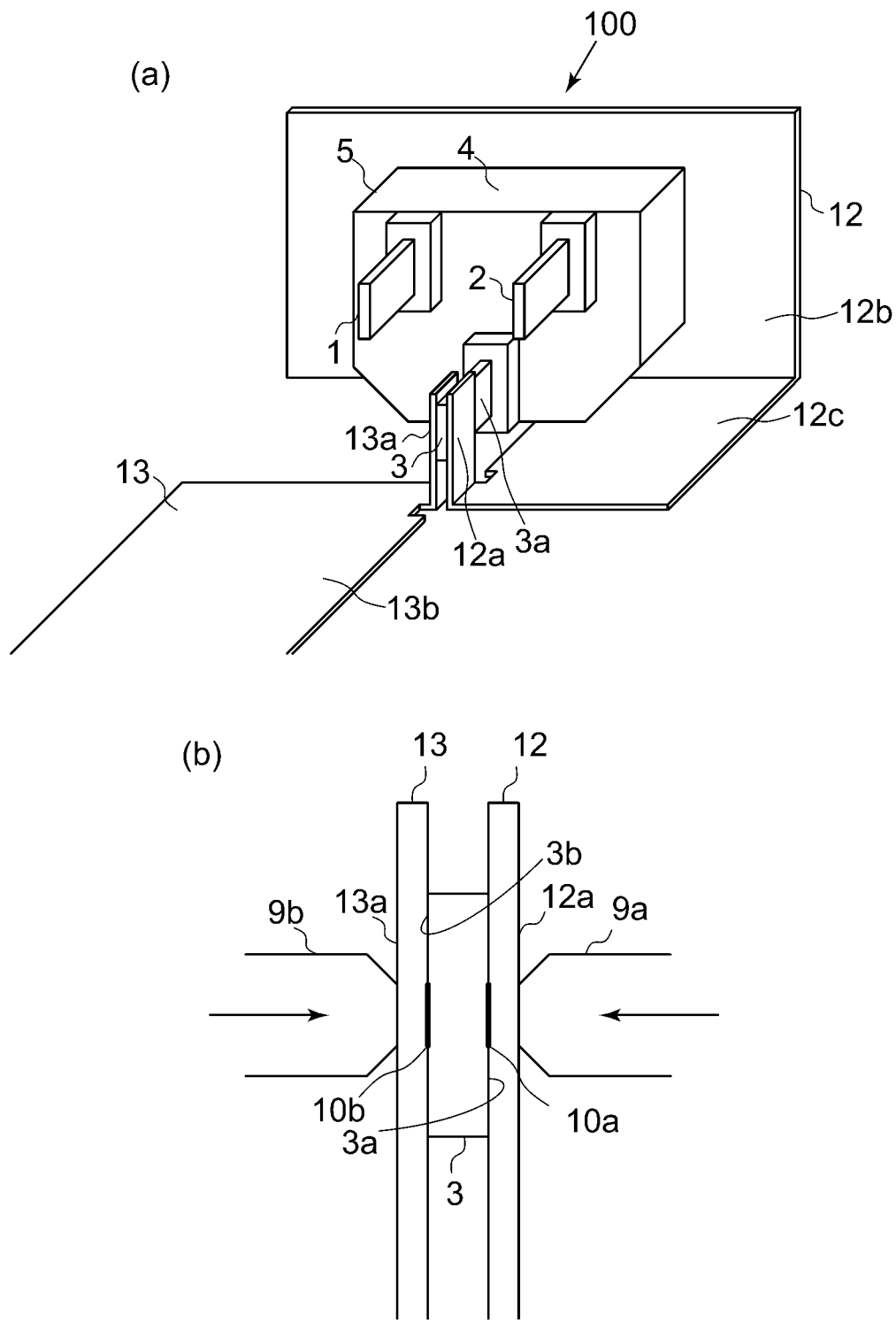

Part (a) of FIG. 2 is a schematic view showing structures of the AC inlet and casing metal plates in which a first portion and a second portion are constituted by separate members. Constituent elements similar to those in FIG. 1 are represented by the same reference numerals or symbols and will be omitted from description. A first casing metal plate 12 is a casing metal plate of the electronic device 100 and is constituted by a zinc-plated steel plate. This first casing metal plate 12 includes a first portion 12a made of a first metal material, a portion 12b for holding the mold portion 4 of the AC inlet 5, and a portion 12c joining the first portion 12a and the portion 12b.

A second casing metal plate 13 which is constituted by a separate member from the casing metal plate 12 of the electronic device 100 and which is provided inside the electronic device 100, and is constituted by a zinc-plated steel plate. The casing metal plate 13 includes a second portion 13a made of a second metal material and a portion 13b joined to the second portion 13a. The two casing metal plates 12 and 13 constituted by separate members are disposed so as to sandwich the ground terminal 3 of the AC inlet 5. Specifically, in the casing metal plate 12, the portion 12c continuously extends from the portion 12b toward a free end of the ground terminal 3 while avoiding the AC inlet 5. The first portion 12a is continuous to the portion 12 and contact the surface 3a of the ground terminal 3. In the casing metal plate 13, the portion 13a is continuous to the portion 12b and contacts the surface 3b of the ground terminal 3.

Part (b) of FIG. 2 is a schematic view showing a state during joint of the ground terminal 3 of the AC inlet 5 with the casing metal plates 12 and 13. Further, part (b) of FIG. 2 is a schematic view illustrating a joint structure between the ground terminal 3 of the AC inlet 5 and the casing metal plates 12 and 13 when the first portion 12a made of the first metal material and the second portion 13a made of the second metal material are constituted by separate members. In such a constitution, the first portion 12a and the second portion 13a are constituted by the casing metal plates 12 and 13, respectively, of the electronic device 100, which are constituted by the separate members, and are disposed so as to sandwich the ground terminal 3 of the AC inlet 5. Similarly as in part (b) of FIG. 1, a current is caused to flow through the first and second portions 12a and 13a while pressing these portions in arrow directions in part (b) of FIG.

2 by the electrodes 9a and 9b. By this, a contact surface between the surface 3a of the ground terminal 3 of the AC inlet 5 and the first portion 12a and a contact surface between the surface 3b of the ground terminal 3 of the AC inlet 5 and the second portion 13a generate heat, so that joining portions 10a and 10b formed through the diffusion joint are provided.

Thus, by the structure shown in part (b) of FIG. 2, the ground terminal 3 of the AC inlet 5 and the casing metal plate 12 are joined to each other, and the ground terminal 3 of the AC inlet 5 and the casing metal plate 13 are joined to each other. By this, even when the two casing metal plates 12 and 13 which are constituted by the separate members are not fastened with the screws or the like, it is possible to ensure electrical joint between the two casing metal plates 12 and 13.

As described above, the constitution in which the ground terminal 3 of the AC inlet 5 is sandwiched and joined by the casing metal plates 6 (12, 13) of the electronic device 100 and thus the electrodes 9a and 9b and the ground terminal 3 of the AC inlet 5 do not contact each other is employed. By this, a degree of wearing of the electrodes 9a and 9b due to reaction of the copper which is the material of the electrodes 9a and 9b with the tin plating of the surface of the ground terminal 3 of the AC inlet 5 can be reduced, so that the productivity can be improved.

As described above, according to the embodiment 1, the degree of the wearing of the electrodes used during the welding (joint) between the ground terminal of the AC inlet and the casing metal plate(s) is reduced so that the productivity can be improved.

Embodiment 2

[Shape of Ground Terminal of AC Inlet]

In joint (welding) between the ground terminal of the AC inlet and the casing metal plate, there is liability that melt of the mold portion of the AC inlet is caused by conduction of the heat, generated by the pressing energization by the electrodes, to the mold portion. Therefore, in an embodiment 2, a constitution in which the melt of the mold portion of the AC inlet due to the heat during the joint between the ground terminal of the AC inlet and the casing metal plate is prevented will be described. Parts (a), (b) and (c) of FIG. 3 are schematic views showing shapes of ground terminals 31, 32 and 33, respectively, of AC inlets 5 in the embodiment 2, and constituent elements similar to those described in the embodiment 1 are represented by the same reference numerals or symbols and will be omitted from description. In the following description, a portion where one end of each of the ground terminals 31 to 33 of the AC inlets 5 and the mold portion 4 of the associated AC inlet 5 are in contact with the each other is referred to as a contact portion 4a. Further, a joining portion between each of the ground terminals 31 to 33 of the AC inlets 5 and the casing metal plate which is the first portion made of the first metal material or the second portion made of the second metal material is referred to as a joining portion 11 as described in the embodiment 1. Incidentally, in FIG. 3, the joining portion 11 is illustrated only on a right side-side surface of the ground terminal (31, 32, 33) in each of the drawings (parts (a) to (c) of FIG. 3), but also exists on a left side-side surface of the ground terminal (31, 32, 33) in actuality.

(Shape of Part (a) of FIG. 3)

The ground terminal 31 of the AC inlet 5 has a plate-like shape such that the ground terminal 31 includes a surface 31a contacting the first portion of the casing metal plate, a surface 31b contacting the second portion of the casing metal plate, a side surface 31c and a side surface 31d. The side surface 31c is provided at a part thereof with a cut-away portion 31e cut from an end portion toward an inside of the surfaces 31a and 31b. Further, the side surface 31d is provided at a part thereof with a cut-away portion 31f cut from an end portion toward an inside of the surfaces 31a and 31b. By this, the ground terminal 31 of the AC inlet 5 is constituted so that a portion thereof between the joining portion 11 and the contact portion 4a is narrower than the joining portion 11 and the contact portion 4a. As a result, a thermal resistance between the joining portion 11 and the contact portion 4a increases, and therefore, it is possible to prevent the mold portion 4 of the AC inlet 5 from melting due to conduction of heat generation of the joining portion 11, caused during the joint, to the contact portion 4a.

(Shape of Part (b) of FIG. 3)

The ground terminal 32 of the AC inlet 5 has a plate-like shape such that the ground terminal 32 includes a surface 32a contacting the first portion of the casing metal plate, a surface 32b contacting the second portion of the casing metal plate, a side surface 32c and a side surface 32d. The side surface 32c is provided with a recessed portion 32e recessed from the side surface 32c toward the side surface 32d. That is, as regards the ground terminal 32, a thickness thereof at the recessed portion 32e is thinner than a thickness thereof at each of the joining portion 11 and the contact portion 4a. Here, the thickness of the ground terminal 32 refers to a distance between the surface 32a and the surface 32b, in other words, refers to a length (width) of the side surface 32c and the side surface 32d.

In part (b) of FIG. 3, the ground terminal 32 of the AC inlet 5 is constituted so that a portion thereof between the joining portion 11 and the contact portion 4a is thinner than the joining portion 11 and the contact portion 4a. As a result, a thermal resistance between the joining portion 11 and the contact portion 4a increases, and therefore, it is possible to prevent the mold portion 4 of the AC inlet 5 from melting due to conduction of heat generation of the joining portion 11, caused during the joint, to the contact portion 4a. Incidentally, in part (b) of FIG. 3, the constitution in which the recessed portion 32e is provided on the surface 32a was described, but may also be provided on the surface 32b or on both the surface 32a and the surface 32b. Further, in part (b) of FIG. 3, a cross-sectional shape of the recessed portion 32e is a U-character shape, but may only be required that a thickness at the recessed portion 32e is thinner than a thickness at the contact portion 4a and at the joining portion 11, and for example, may also be another shape such as an arcuate shape in cross-section. Further, the recessed portion 32e may also be constituted so as not to have a length from the side surface 32c to the side surface 32d, and may also be required to be a recessed portion provided between the joining portion 11 and the contact portion 4a with respect to a longitudinal direction of the ground terminal 33.

(Shape of Part (c) of FIG. 3)

The ground terminal 33 of the AC inlet 5 has a plate-like shape such that the ground terminal 33 includes a surface 33a contacting the first portion of the casing metal plate, a surface 33b contacting the second portion of the casing metal plate, a side surface 33c and a side surface 33d. The surface 33a and the surface 33c are provided with a hole 33e penetrating through both the surfaces 33a and 33b. The hole 33e is provided between the contact portion 4a and the joining portion 11 with respect to the longitudinal direction of the ground terminal 33.

In part (c) of FIG. 3, the ground terminal 33 of the AC inlet 5 is provided with the hole 33e between the joining portion 11 and the contact portion 4a. As a result, a thermal resistance between the joining portion 11 and the contact portion 4a increases, and therefore, it is possible to prevent the mold portion 4 of the AC inlet 5 from melting due to conduction of heat generation of the joining portion 11, caused during the joint, to the contact portion 4a. Incidentally, in part (c) of FIG. 3, the constitution in which a single hole is provided between the joining portion 11 and the contact portion 4a was described, but a plurality of holes may also be provided, i.e., at least one hole may only be required to be provided. Further, in part (c) of FIG. 3, a shape of the hole 33e is a rectangular shape, but may only be required that the hole is provided between the contact portion 4a and the joining portion 11, and for example, may also be another shape such as a circular shape.

As described above, by the shapes of the ground terminals 31 to 33 of the AC images 5, a thermal resistance between the joining portion 11 formed between each of the ground terminals 31 to 33 and the casing metal plate and the contact portion 4a formed between each of the ground terminals 31 to 33 and the mold portion 4 is increased. By this, the melting of the mold portion 4 due to conduction of heat from the joining portion 11 to the contact portion 4a can be prevented.

As described above, according to the embodiment 2, it is possible to reduce the degree of wearing of the electrodes used during the joint between the ground terminal of the AC inlet and the casing metal plate and thus to improve the productivity.

Next, embodiments 3 to 9 will be described.

[Conventional Welding Method]

In order to make comparison with the embodiments described below, a conventional welding method between different metal materials will be described using FIGS. 10 and 11. Parts (a) and (b) of FIG. 10 are schematic views for illustrating a structure of an inlet 205. Part (a) of FIG. 10 is the schematic view of the inlet 205 as viewed in an insertion direction in which a power supply cable (not shown) is inserted into the inlet 205, and part (b) of FIG. 10 is the schematic view of the inlet 204 as viewed in a direction opposite to the insertion direction of part (a) of FIG. 10. The inlet 205 includes inlet terminals 201 and 202, a ground terminal 203 and a mold portion 204. The ground terminal 203 is a terminal made of copper. The inlet terminals 201 and 202 are terminals to which a current is supplied from an AC power supply (voltage source) (not shown). The ground terminal 203 is a terminal joined to a metal plate (hereinafter referred to as a frame GND) which is the ground (hereinafter referred to as GND) of the electronic device. The mold portion 204 is a member for fixing the inlet terminals 201 and 202 and the ground terminal 203.

Part (c) of FIG. 10 is a schematic view showing a structure in which the inlet 205 and a metal plate 2010 of the electronic device are joined to each other. The metal plate 2010 not only holds the mold portion 204 of the inlet 205 but also has a structure in which the ground terminal 203 is sandwiched by a first portion 2010a and a second portion 2010b thereof. That is, it can also be said that the first portion 2010a and the second portion 2010b are a metal plate clamping portion. Incidentally, the metal plate 2010 is made of a steel. Here, the metal plate 2010 includes the first portion 2010a, the second portion 2010b, a portion 2010c, a portion 2010d and a bent portion 2010e. The portion 2010d continuously extends from a portion 2010c toward a free end (end portion opposite from the mold portion 204) of the ground terminal 203 while avoiding the AC inlet 205. The first portion 2010a is continuous to a portion 2010d and contacts a first surface 203a of the ground terminal 203. The second portion 2010b is continuous to the first portion 2010a via a bent portion 2010e and contacts a second surface 203b of the ground terminal 203 opposite from the first surface 203a. Thus, the first portion 2010e and the second portion 2010b are constituted integrally with the metal plate 2010 (specifically the portion 2010c). Further, the metal plate 2010 of the electronic device, specifically the first portion 2010a and the second portion 2010b are disposed so as to sandwich the ground terminal 203 of the AC inlet 205. The ground terminal 203 is welded to the first portion 2010a and the second portion 2010b of the metal plate 2010.

Parts (a) to (c) of FIG. 11 are sectional views for illustrating a processor (welding step) for welding the ground terminal 203, the first portion 2010a and the second portion 2010b together. Incidentally, the bent portion 2010e is not shown. Part (a) of FIG. 11 shows a state before the welding is performed. A first electrode 2020a and a second electrode 2020b are cylindrical electrodes each having a free end portion chamfered in a C-shape, and are members for causing a current through the ground terminal 203 and the first and second portions 2010a and 2010b. Part (b) of FIG. 11 shows a state in which the ground terminal 203 and the first and second portions 2010a and 2010b are pressed in arrow directions of part (b) of FIG. 11 by the first and second electrodes 2020a and 2020b. In the state of part (b) of FIG. 11, a current is applied from the first electrode 2020a to the second electrode 2020b. Incidentally, a direction of the current may also be an opposite direction. Part (c) of FIG. 11 shows a state in which after the current application, a surface 203a of the ground terminal 203 and the first portion 2010a are welded to each other, and a surface 203b of the ground terminal 204 and the second portion 2010b are welded to each other. When the current is applied from the first electrode 2020a to the second electrode 2020b, Joule heat is generated by a contact resistance of an interface between the surface 203a of the ground terminal 203 and the first portion 2010a and by the current, so that the surface 203a and the first portion 2010a are welded to each other. Similarly, Joule heat is generated by a contact resistance of an interface between the surface 203b of the ground terminal 203 and the second portion 2010b and by the current, so that the surface 203b and the second portion 2010b are welded to each other. Incidentally, the ground terminal 203 made of the copper and the metal plate 2010 made of the steel were described as an example, but may also be constituted by different metal materials other than these metal materials.

Embodiment 3

A different metal welding structure in an embodiment 3 will be described. In an embodiment 3, a constitution in which productivity is improved by reducing a value of a current for obtaining a heat quantity need for welding and a constitution in which melting of a mold member attached to metal materials is prevented will be described. Incidentally, the structure of the inlet 205 is similar to that shown in parts (a) and (b) of FIG. 10 and will be omitted from description. Further, a structure of a metal plate of the electronic device (not shown) is similar to the metal plate structure shown in part (c) of FIG. 10. Incidentally, in this embodiment, the metal plate is a metal plate 2030. FIGS. 4 and 5 are schematic views showing structures of welding portions of metal plates 2030, 2032, 2034 and 2036 to the ground terminal 203.

[Structure of Metal Plate]

The electronic device (not shown) includes the inlet 205 and the metal plate 2030. The metal plate 2030 includes a first portion 2030a, a second portion 2030b and a bent portion 2030e. Incidentally, also, the metal plate 2030 includes portions corresponding to the portions 2010c and 2010d described with reference to FIG. 11, and the metal plates 2032, 2034 and 2036 described later are also similarly constituted. The first portion 2030a is a first member made of iron which is a first metal material, and the second portion 2030b is a second member made of iron which is a second metal material. Incidentally, the ground terminal 203 is a third member made of copper which is a third metal material. The first portion 2030a is a portion contacting the surface 203a of the ground terminal 203. The second portion 2030b is continuous to the first portion 2030a through the bent portion 2030e end contacts the surface 203b of the ground terminal 203. The metal plate 2030 of the electronic device, specifically the first portion 2030a and the second portion 2030b are disposed so as to sandwich the ground terminal 203 of the inlet 205. The ground terminal 203 is welded to the first portion 2030a and the second portion 2030b of the metal plate 2030.

In part (a) of FIG. 4, the first portion 2030a and the second portion 2030b are provided with a projected portion 2031a which is a dot-like first projected portion and a projected portion 2031b which is a second projected portion, respectively, so as to project on an inner surface (surface contacting the ground terminal 203) side. The first portion 2030a and the second portion 2030b are provided with the projected portion 2031a and the projected portion 2031b, respectively, at a current value smaller than a current value in the conventional example in which no projected portion is provided, it is possible to generate a heat quantity necessary for welding. This is because each of a contact resistance of an interface between the surface 203a of the ground terminal 203 and the first portion 2030a and a contact resistance of an interface between the surface 203b of the ground terminal 203 and the second portion 2030b is increased. By this, productivity can be improved. Further, a heat generation area can be localized, so that melting of the mold portion 204 attached to the ground terminal 203 can be prevented.

Incidentally, the projected portion 2031a (or the projected portion 2031b) shown in part (a) of FIG. 5 has a conical shape, but may also have another shape, and may only be required to have a shape such that the projected portion point-contacts the surface 203a (or the surface 203b) of the ground terminal 203 before the welding. Further, a position of the projected portion 2031a may preferably be a substantially central portion of a region where a first electrode 2020a contacts the first portion 2030a, but the first electrode 2020a may only be required that the projected portion 2031a is disposed in a region where the first electrode 2020a contacts the first portion 2030a. A position of the projected portion 2031b may similarly preferably be a substantially central portion of a region where a second electrode 2020b contacts the second portion 2030b, but the first electrode 2020b may only be required that the projected portion 2031b is disposed in a region where the second electrode 2020b contacts the second portion 2030b.

(Modified Embodiment of Shape of Projected Portion)

In part (b) of FIG. 4, a structure in which a shape of the projected portion is changed is shown. The metal plate 2032 includes a first portion 2032a, a second portion 2032b and a bent portion 2032c. The first portion 2032a is provided with a projected portion 2033a which is a linear-shaped first projected portion project on an inner surface side of the first portion 2032a. Further, the second portion 2032b is provided with a projected portion 2033b which is a linear-shaped second projected portion projected on an inner surface side of the second portion 2033b. In this structure, compared with the structure shown in part (a) of FIG. 4, a contact resistance becomes low and thus a current necessary for welding increases, but a contact area becomes large and thus joint strength can be enhanced.

Incidentally, the first portion 2032a (or the second portion 2032b) was provided with the single projected portion 2033a (or the projected portion 2033b), but the projected portion 2033a (or the projected portion 2033b) may also be divided into a plurality of projected portions. Further, the first portion 2032a (or the second portion 2032b) may also be provided with a plurality of projected portions 2033a (or projected portions 2033b). Further, the projected portion 2033a (or the projected portion 2033b) in part (b) of FIG. 4 has a semicylindrical shape, but may also have another shape, and may only be required to have a shape such that the projected portion line-contacts the surface 203a (or the surface 203b) of the ground terminal 203 before the welding. Further, a position of the projected portion 2033a may preferably be a substantially central portion of a region where a first electrode 2020a contacts the first portion 2032a, but the first electrode 2020a may only be required that the projected portion 2031a is disposed in a region where the first electrode 2020a contacts the first portion 2032a. A position of the projected portion 2033b may similarly preferably be a substantially central portion of a region where a second electrode 2020b contacts the second portion 2032b, but the first electrode 2020b may only be required that the projected portion 2033b is disposed in a region where the second electrode 2020b contacts the second portion 2032b.

Parts (a) and (b) of FIG. 5 show structures in which the metal plates 2034 and 2036 do not include the bent portion and thus in which the first portion and the second portion are separate members. A first portion 2034a shown in part (a) of FIG. 5 is provided with a dot-shaped projected portion 2035a projecting on a side where the projected portion 2035a contacts the ground terminal 203. Further, a second portion 2034b is provided with a dot-shaped projected portion 2035b projecting on a side where the projected portion 2035b contacts the ground terminal 203.

Further, a first portion 2036a shown in part (b) of FIG. 5 is provided with a linear-shaped projected portion 2037a projecting on a side where the projected portion 2037a contacts the ground terminal 203. A second portion 2036b is provided with a linear-shaped projected portion 2037b projecting on a side where the projected portion 2037b contacts the ground terminal 203. In part (b) of FIG. 5, it is possible to reduce use amounts and a machining cost of the metal plates 2034 and 2036.

As described above, the contact resistance between the ground terminal 203 and each of the first portion and the second portion of the metal plates 2030, 2032, 2034 and 2036 is increased, so that a current value for obtaining a heat quantity necessary for welding is reduced and thus productivity can be improved. Further, a heat generation area is localized, so that melting of the mold member attached to the metal material can be prevented. In this embodiment, the constitution in which the projected portions are provided on each of the metal plates 2030, 2032, 2034 and 2036 was described, but the present invention is also applicable to a constitution in which the projected portions are provided on the ground terminal 203 or a constitution in which the projected portions are provided on both the metal plate and the ground terminal 203 since a similar effect can be achieved. Further, the projected portions may also be provided on each of the inlet terminals 201 and 202 to which the current is supplied from the AC power supply.

As described above, according to the embodiment 2, a degree of improper welding is reduced, so that productivity can be improved.

Embodiment 4

In an embodiment 4, a constitution in which stable welding can be performed even when the loss of thermal balance due to the Peltier effect occurs will be described.

FIGS. 6 and 7 are schematic views each illustrating a structure of a first portion and a second portion of associated one of metal plates 2040, 2042, 2044 and 2046 of the embodiment 2.

[Structure of Metal Plate]

In part (a) of FIG. 6, in the metal plate 2040, a first portion 2040a is joined to a second portion 2040b through a bent portion 2040e. The second portion 2040b is provided with a dot-shaped projected portion 2041b projecting on an inner surface (surface contacting the ground terminal 203) side of the second portion 2040b. On the other hand, the first portion 2040a is not provided with the projected portion projecting on an inner surface side thereof. Incidentally, a shape the number, a position and the like of the projected portion 2041b are similar to those in the embodiment 1.

By this constitution, a contact resistance between the first portion 2040a and the surface 3a of the ground terminal 3 and a contact resistance between the second portion 2040b and the surface 3b of the ground terminal 3 are different from each other. Specifically, the contact resistance between the second portion 2040b provided with the projected portion 2041b and the surface 3b of the ground terminal 3 is larger than the contact resistance between the first portion 2040a provided with no projected portion and the surface 3a of the ground terminal 3.

Accordingly, the Joule heat generating when the current is applied becomes larger at a joining point between the second portion 2040b and the ground terminal 3. By the Peltier effect, heat generation occurs at one joint point and heat absorption occurs at the other joint point, and therefore, when the Joule heat is made different so that a sum of heat generation and heat absorption due to the Peltier effect and heat generation due to the Joule heat becomes uniform, stable welding can be performed. That is, at the joint point where the heat generation occurs by the Peltier effect, a constitution of the first portion 2040a provided with the projected portion is employed so that the Joule heat becomes small. On the other hand, at the joint point where the heat absorption occurs by the Peltier effect, a constitution of the second portion 2040b provided with the projected portion 2041b may only be required to be employed so that the Joule heat becomes large.

(Modified Embodiment 1 of Shape of Projected Portion)

Part (b) of FIG. 6 shows a structure of a linear-shaped projected portion. In the metal plate 2042, a first portion 2042a is joined to a second portion 2042b through a bent portion 2042e. The second portion 2042b is provided with the linear-shaped projected portion 2043b projecting on an inner surface side of the second portion 2042b. On the other hand, the first portion 2042a is provided with no projected portion projecting on an inner surface side of the first portion 2042a. By this constitution, similarly as the constitution of part (a) of FIG. 6, the Joule heat generating during welding can be made different, and therefore, a similar effect can be achieved.

(Modified Embodiment 2 of Shape of Projected Portion)

Part (a) of FIG. 7 shows a structure in which the number of the projected portion is changed. In the metal plate 2044, a first portion 2044a is joined to a second portion 2044b through a bent portion 2044e. The second portion 2044b is provided with a single dot-shaped projected portion 2045b projecting on an inner surface side of the second portion 2044b. On the other hand, the first portion 2044a is provided with two dot-shaped projected portions 2045a and 2045c projecting on an inner surface side of the first portion 2044a. At the joint point where heat absorption occurs by the Peltier effect, the number of the projected portions is decreased (i.e., the contact resistance is increased) so that the Joule heat becomes large. On the other hand, at the joint point where the heat generation occurs by the Peltier effect, the number of the projected portions is increased (i.e., the contact resistance is decreased) so that the Joule heat becomes small. Thus, a thermal balance is kept by the number of the projected portions provided. By this constitution, similarly as the constitution of part (a) of FIG. 6, the Joule heat generating during welding can be made different, so that a similar effect can be achieved. Here, the number of the projected portions is not limited to three which is combination of one and two, but the contact resistance can be made different when the number of the projected portions is different, so that a similar effect can be obtained.

(Modified Embodiment 3 of Shape of Projected Portion)

Part (b) of FIG. 7 shows a structure in which the shape of the projected portion is changed. In the metal plate 2046, a first portion 2046a is joined to a second portion 2046b through a bent portion 2046e. The second portion 2046b is provided with the dot-shaped projected portion 2047b projecting on an inner surface side of the second portion 2046b. On the other hand, the first portion 2046a is provided with the linear-shaped projected portion 2047a projecting on an inner surface side of the first portion 2046a.

The dot-shaped projected portion 2047b contacts the surface 203b of the ground terminal 203, and the linear-shaped projected portion 2047a contacts the surface 203a of the ground terminal 203. For this reason, the contact resistance between the first portion 2046a provided with the linear-shaped projected portion 2047a and the surface 203a of the ground terminal 203 is smaller than the contact resistance between the second portion 2046b provided with the dot-shaped projected portion 2047b and the surface 203b of the ground terminal 203. At the joint point where the heat absorption occurs by the Peltier effect, the dot-shaped projected portion is disposed so that the Joule heat becomes large, and at the joint point where the heat generation occurs by the Peltier effect, the linear-shaped projected portion is disposed so that the Joule heat becomes small. Also, in this constitution, similarly as the constitution of part (a) of FIG. 6, the Joule heat can be made different, so that a similar effect can be achieved.

As described above, the contact resistances of the two joint points of the ground terminal 203 with the first and second portions are made different from each other, so that even when the loss of the thermal balance due to the Peltier effect occurs, stable welding can be performed. Further, a constitution in which the above-described constitutions are provided on the ground terminal 3 may also be employed. As described above, according to the embodiment 4, a degree of improper welding is reduced, so that productivity can be improved.

Embodiment 5

An embodiment 5 is characterized in that in a different metal joint member including a flat surface portion welded to the inlet ground terminal and a bent portion, a cross-sectional area of the bent portion is made smaller than a cross-sectional area of the flat surface portion. FIG. 8 is a schematic view illustrating a structure of a welding portion of the inlet metal plate 2010 in this embodiment.

The welding portion includes flat surface portions 2060a and 2060b sandwiching the inlet ground terminal 3 and a bent portion 2060c. The bent portion 2060c is provided with a hole 2061. The bent portion 2060c has cross-sectional areas S1, and each of the flat surface portions 2060a and 2060b has a cross-sectional area S2. By providing the hole 2061, the cross-sectional area S1 is made smaller than the cross-sectional area S2 (S1<S2), so that an elastic force of the inlet metal plate 2010 after the welding can be made smaller than an elastic force of the inlet metal plate in the conventional constitution with no projected portion. Further, a current I2 which flows during the welding and which does not contribute to the welding can be reduced since a resistance value of a current path is increased by the decreased cross-sectional area S1 of the bent portion 2060c.

As described above, by adding the hole 2061 in the bent portion 2060c, the elastic force of the inlet metal plate 2010 after the welding is decreased, so that peeling-off of the welding portion can be prevented. Further, the unuseful current I2 which does not contribute to the welding, so that the productivity can be improved. In this embodiment, the constitution in which the single hole is added in the bent portion 2060c was described, but a similar effect can be obtained even in a constitution in which a plurality of holes are provided in the bent portion 2060c, and therefore, the constitution in which the plurality of holes are provided can also be employed.

Further, as another constitution, a constitution in which a cross-sectional area is made small without providing the hole is shown in FIG. 9.

In FIG. 9, the welding portion includes flat surface portions 2070a and 2070b sandwiching the inlet ground terminal 3 and a bent portion 2070c. A bending width of the bent portion 2070c with respect to a direction perpendicular to a bending direction is W1, and a bending direction of each of the flat surface portions 2070a and 2070b with respect to the direction is W2. The bent portion 2070c has cross-sectional areas S3, and each of the flat surface portions 2070a and 2070b has a cross-sectional area S4. The bending width W1 of the bent portion 2070c is smaller than the bending width W2 of each of the flat surface portions 2070a and 2070b (W1<W2). By this, the cross-sectional area S3 is made smaller than the cross-sectional area S4 (S3<S4), so that an elastic force of the inlet metal plate 2010 after the welding can be made smaller than an elastic force of the inlet metal plate in a constitution in which the cross-sectional area is not mad small. Further, a current I2 which flows during the welding and which does not contribute to the welding can be reduced since a resistance value of a current path is increased by the decreased cross-sectional area S3 of the bent portion 2070c.

As described above, by decreasing the bending width W1 of the bent portion 2070c, the elastic force of the inlet metal plate 2010 after the welding is decreased, so that peeling-off of the welding portion can be prevented. Further, the unuseful current I2 which does not contribute to the welding, so that the productivity can be improved.

Embodiment 6

In an embodiment 6, a constitution in which a welding area is made different will be described. A structure of the inlet 5 which is a welding member is similar to the structure of the inlet 5 shown in parts (a) and (b) of FIG. 10 and will be omitted from description. Further, a structure of a metal plate provided in the electronic device (not shown) is similar to the structure of the metal plate shown in part (c) of FIG. 10. Incidentally, in the embodiment 6, a metal plate 3030 is used as the metal plate. Part (a) of FIG. 12 is a schematic view showing a structure of a welding portion of the metal plate 3030 with a ground terminal 303. In the embodiment 6, a shape of a surface of a free end portion of each of a first electrode 3020a and a second electrode 3020b is a circular shape.

[Structure of Metal Plate]

Part (a) of FIG. 12 is the schematic view illustrating a structure of a principal part of the metal plate 3030 in the embodiment 6. The electronic device (not shown) includes the inlet 5 and the metal plate 3030 (or a metal plate 3035 described later). The metal plate 3030 includes a first portion 3030a, a second portion 3030b and a bent portion 3030e. Incidentally, the metal plate 3030 also includes portions corresponding to the portions 3010c and 3010d described with reference to FIG. 10, and this is also true for the metal plate 3035 described later. The first portion 3030a is a first member made of iron which is a first metal material, and the second portion 3030b is a second member made of iron which is a second metal material. Incidentally, the ground terminal 303 is a third member made of copper which is a third metal material. In the embodiment 6, the first portion 3030a and the second portion 3030b are continuously integrated with each other by the bent portion 3030e, and a width of the metal plate 3030 (hereinafter, this width is referred to as a metal plate width) is such that the metal plate width of the second portion 3030b is smaller (shorter or narrower) than the metal plate width of the first portion 3030a.

Here, the metal plate width refers to a length of the ground terminal 3 with respect to a widthwise direction (Z-direction). The Z-direction is a direction which is at least one of two directions (Y-direction and Z-direction) perpendicular to a direction (X-direction) in which forces are applied to the first electrode 3020a and the second electrode 3020b. In other words, it can be said that the Z-direction is a direction which is at least one of two directions parallel to surfaces 303a and 303b. When the metal plate width of the first portion 3030a is W30a and the metal plate width of the second portion 3030b is W30b, W30a>W30b holds. Incidentally, in the embodiment 6, the metal plate width of the bent portion 3030e is substantially equal to the metal plate width W30b of the second portion 3030b, but the metal plate width of the bent portion 3030e may also be made substantially equal to the metal plate width W30a of the first portion 3030a.

[Metal Plate Width and Joule Heat]

Parts (a) and (b) of FIG. 13 are sectional views of the ground terminal 303, the first portion 3030a, the second portion 3030b, the first electrode 3020a and the second electrode 3020b. Part (a) of FIG. 13 is the sectional view of a welding portion of which center is cut and viewed in the Z-direction, and part (b) of FIG. 13 is the sectional view of the welding portion of which center is cut and viewed in the Y-direction. A first welding portion 3031a is a portion where the surface 303a of the ground terminal 303 and the first portion 3030a are welded to each other. A second welding portion 3031b is a portion where the surface 303b of the ground terminal 303 and the second portion 3030b are welded to each other.

As shown in part (a) of FIG. 13, a length of the welding portion 3031b with respect to the Y-direction and a length of the welding portion 3031a with respect to the Y-direction are substantially equal to each other. On the other hand, as shown in part (b) of FIG. 13, as described above, the metal plate width W30b of the second portion 3030b is narrower than the metal plate width W30a of the first portion 3030a, and therefore, a width of the welding portion 3031b is also narrower (smaller) than a width of the welding portion 3031a. For this reason, an area S31b of the welding portion 3031b is smaller than an area S31a of the welding portion 3031a (S31b<S31a). Incidentally, as shown in part (b) of FIG. 13, the metal plate width W30b of the second portion 3030b in the embodiment 6 is smaller than the length of the second electrode 3020b with respect to the Z-direction.

Part (c) of FIG. 13 is a sectional view cut along an A-A line of part (b) of FIG. 13 as viewed in the X-direction, and part (d) of FIG. 13 is a sectional view cut along a B-B line of part (a) of FIG. 13 as viewed in the X-direction. A region 3032a is a region where a circular surface of a free end of the first electrode 3020a is projected on the A-A cross-section, and a region 3032b is a region where a circular surface of a free end of the second electrode 3020b is projected on the B-B cross-section. An end portion 3033a shows one end portion (on the free end side of the ground terminal 303) in a region where the surface 303a of the ground terminal 303 and the first portion 3030a contact each other, and an end portion 3033b shows the other end portion (on the mold portion 4 side) in a region where the surface 303b of the ground terminal 303 and the second portion 3030b contact each other. An end portion 3034a shows one end portion (on the free end side of the ground terminal 303) of the second portion 3030b, and an end portion 3034a shows the other end portion (on the mold portion 4 side) of the second portion 3030b.

As shown in part (d) of FIG. 13, the end portions 3034a and 3034b of the second portion 3030b are included inside the region 3032b corresponding to the circular shape of the free end of the second electrode 3020b. For this reason, the area S31b of the welding portion 3031b indicated as a half-time portion is smaller than the area S31a of the welding portion 3031a.

By this constitution, a contact resistance between the first portion 3030a and the surface 303a of the ground terminal 303 and a contact resistance between the second portion 3030b and the surface 303b of the ground terminal 303 are different from each other. Specifically, the contact resistance between the second portion 3030b and the ground terminal 303 is larger than the contact resistance between the first portion 3030a and the ground terminal 303. Accordingly, the Joule heat generating at the welding portions 3031a and 3031b when a current is applied between the first electrode 3020a and the second electrode 3020b is larger at a welding (joint) point between the second portion 3030b and the ground terminal 303 than at a welding (joint) point between the first portion 3030a and the ground terminal 303.

Here, by the Peltier effect, heat generation occurs at one welding point and heat absorption occurs at the other welding point. For this reason, when the Joule heat is made different so that a sum of heat absorption and heat generation by the Peltier effect and heat generation by the Joule heat becomes substantially uniform at the two welding points, stable welding can be carried out. That is, at the welding point (welding portion 3031a) where the heat generation by the Peltier effect occurs, the first portion 3030a is disposed so that the Joule heat becomes small. On the other hand, at the welding point (welding portion 3031b) where the heat absorption by the Peltier effect occurs, the second portion 3030b is disposed so that the Joule heat becomes large (W30b<W30a in terms of the metal plate width).

[Modified Embodiment of Metal Plate]

Part (b) of FIG. 12 shows a constitution in which the metal plate 3035 is not provided with the bent portion, and shows the constitution in which a first portion 3035a and a second portion 3035b are separate members. Even in this constitution, an area of a welding portion between the ground terminal 303 and the first portion 3035a and an area of a welding portion between the ground terminal 303 and the second portion 3035b can be made different from each other. For this reason, an effect similar to the effect of the constitution of part (a) of FIG. 12 can be achieved. Compared with the constitution of part (a) of FIG. 12, it is possible to reduce a use amount and a processing cost of the metal plate 3035.

As described above, the contact resistance of the welding point between the ground terminal 303 and the first portion and the contact resistance of the welding point between the ground terminal 303 and the second portion are made different from each other. By this, even the loss of thermal balance by the Peltier effect occurs, the thermal balance can be kept by the Joule heat generating at the welding points, so that stable welding can be performed. Incidentally, in this embodiment, the shapes of the free end surfaces of the first and second electrodes 3020a and 3020b were the circular shapes, but may also be other shapes such as rectangular shapes.

As described above, according to the embodiment 6, a degree of improper welding can be reduced.

Embodiment 7

[Structure of Metal Plate]

In an embodiment 7, a constitution in which thermal capacity of a metal plate is made different will be described.

Parts (a) and (b) of FIG. 13 are sectional views of the ground terminal 303, a metal plate 3040, the first electrode 3020a and the second electrode 3020b. The metal plate 3040 includes a second portion 3040a which is a second member and a first portion 3040b which is a second member but is not provided with a bent portion. Part (a) of FIG. 14 is the sectional view of a welding portion of which center is cut and viewed in the Z-direction, and part (b) of FIG. 14 is the sectional view of the welding portion of which center is cut and viewed in the Y-direction. The second portion 3040a and the first portion 3040b are separate members. A second welding portion 3041a shows a portion where the surface 303a of the ground terminal 303 and the second portion 3040a are welded to each other. A first welding portion 3041b shows a portion where the surface 303b of the ground terminal 303 and the first portion 3040b are welded to each other. The second portion 3040a has a thickness t1, and the first portion 3040b has a thickness t2. Here, the thickness refers to a length of the metal plate 3040 with respect to the X-direction. The thickness t2 of the first portion 3040b is larger (thicker) than the thickness t1 of the second portion 3040a (t2>t1). Incidentally, a metal plate width of the second portion 3040b and a metal plate width of the first portion 3040a and substantially equal to each other.

[Thickness and Thermal Capacity of Metal Plate]

Part (c) of FIG. 14 is a sectional view cut along an A-A line of part (b) of FIG. 14 as viewed in the X-direction, and part (d) of FIG. 14 is a sectional view cut along a B-B line of part (a) of FIG. 14 as viewed in the X-direction. A region 3042*a* shows a region where a circular surface of a free end of the first electrode 3020*a* is projected on the A-A cross-section, and a region 3042*b* shows a region where a circular surface of a free end of the second electrode 3020*b* is projected on the B-B cross-section. An end portion 3043*a* shows one end portion in a region where the surface 303*a* of the ground terminal 303 and the second portion 3040*a* contact each other, and an end portion 3043*b* shows the other end portion in a region where the surface 303*b* of the ground terminal 303 and the first portion 3040*b* contact each other. The Areas of the welding portions 3041*a* and 3041*b* indicated as half-time portions are substantially equal to each other.

By this constitution, the thickness t1 and the thickness t2 are different from each other, and therefore, thermal capacity of the first portion 3040*a* and the thermal capacity of the first portion 3040*b* are different from each other. Specifically, the thermal capacity of the first portion 3040*b* is larger than the thermal capacity of the second portion 3040*a*. Accordingly, temperature rise of the welding portion when a current is applied between the first electrode 3020*a* and the second electrode 3020*b* is more moderate at the first portion 3040*b* than at the second portion 3040*a*. The area of the welding portion 3041*a* and the area of the welding portion 3041*b* are substantially equal to each other, and therefore, values of the Joule heat generating when the current is caused to flow through the first and second welding portions are substantially equal at both the welding portions to each other.

Here, as regards the Peltier effect, heat generation occurs at one welding (joint) point and heat absorption occurs at the other welding point, and therefore, correspondingly, the loss of thermal balance between the welding portions 3041*a* and 3041*b* is caused to occur. Therefore, at the welding point (welding portion 3041*b*) where the heat generation occurs by the Peltier effect, the first portion 3040*b* large in thermal capacity is disposed so that the temperature rise becomes moderate. On the other hand, at the welding point (welding portion 3041*a*) where the heat absorption occurs by the Peltier effect, the second portion 3040*a* small in thermal capacity is disposed so that the temperature rise becomes abrupt. By this, degrees of the temperature rise at the welding portions 3041*a* and 3041*b* are substantially equal to each other, so that stable welding can be performed.

As described above, the thermal capacity of the second portion 3040*a* and the thermal capacity of the first portion 3040*b* are made different from each other, so that stable welding can be carried out even when the loss of the thermal balance due to the Peltier effect occurs. Incidentally, a constitution in which the metal plate 3040 includes the bent portion and the second portion 3040*a* and the first portion 3040*b* are provided integrally with each other through the bent portion and in which a thickness is gradually changed, for example, at the bent portion. As described above, according to the embodiment 7, improper welding can be reduced.

Embodiment 8

In an embodiment 8, a constitution other than the embodiment 7 in which the thermal capacity of the metal plate is made different will be described. FIG. 15 is the schematic view illustrating a structure of a metal plate 3060 in the embodiment 8. The metal plate 3060 includes a first portion 3060*a* which is a first member, a second portion 3060*b* which is a second member and a bent portion 3060*e*. In the embodiment 8, the first portion 3060*a* and the second portion 3060*b* are integrated with each other, and a metal plate width w2 of the second portion 3060*b* is narrower (shorter) than a metal plate width w1 of the first portion 3060*a* (w1>w2). Incidentally, in the embodiment 8, the metal plate width of the bent portion 3060*e* is substantially equal to the metal plate width w2 of the second portion 3060*b*, but the metal plate width of the bent portion 3060*e* may also be made substantially equal to the metal plate width w1 of the first portion 3060*a*.

[Metal Plate Width and Thermal Capacity]

Parts (a) to (d) of FIG. 16 are sectional views of the ground terminal 303, the first portion 3060*a*, the second portion 3060*b*, the first electrode 3020*a* and the second electrode 3020*b*. Part (a) of FIG. 16 is the sectional view of a welding portion of which center is cut and viewed in the Z-direction, and part (b) of FIG. 16 is the sectional view of the welding portion of which center is cut and viewed in the Y-direction. The first portion 3060*a* and the second portion 3060*b* are integrated with each other. A first welding portion 3061*a* is a portion where the surface 303*a* of the ground terminal 303 and the first portion 3060*a* are welded to each other. A second welding portion 3061*b* is a portion where the surface 303*b* of the ground terminal 303 and the second portion 3060*b* are welded to each other. The metal plate width w1 is a width of the first portion 3060*a*, and the metal plate width w2 is a width of the second portion 3060*b*, and the metal plate width w2 is shorter than the metal plate width w1 (w2<w1). Further, the metal plate width w2 of the second portion 3060*b* is larger than the width (length with respect to the Z-direction) of a circular free end surface of the second electrode 3020*b*.

Part (c) of FIG. 16 is a sectional view cut along an A-A line of part (b) of FIG. 16 as viewed in the X-direction, and part (d) of FIG. 16 is a sectional view cut along a B-B line of part (a) of FIG. 16 as viewed in the X-direction. A region 3062*a* shows a region where a circular surface of a free end of the first electrode 3020*a* is projected on the A-A cross-section, and a region 3062*b* shows a region where a circular surface of a free end of the second electrode 3020*b* is projected on the B-B cross-section. An end portion 3063*a* shows one end portion in a region where the surface 303*a* of the ground terminal 303 and the first portion 3060*a* contact each other, and an end portion 3063*b* shows the other end portion in a region where the surface 303*b* of the ground terminal 303 and the second portion 3060*b* contact each other. Further, an end portion 3064*a* shows one end portion in a region where the surface 303*k* of the ground terminal 303 and the second portion 3060*b* contact each other, and an end portion 3064*a* shows the other end portion in a region where the surface 303*b* of the ground terminal 303 and the second portion 3060*b* contact each other. The areas of the welding portions 3061*a* and 3061*b* indicated as half-time portions are substantially equal to each other.

By this constitution, the metal plate widths w1 and w2 are different from each other, and therefore, the thermal capacitance of the first portion 3060*a* and the thermal capacitance of the second portion 3060*b* are different from each other. Specifically, the thermal capacitance of the first portion 3060*a* is larger than the thermal capacitance of the second portion 3060*b*. Accordingly, a degree of the temperature rise when the current is applied between the first electrode 3020*a* and the second electrode 3020*b* is more moderate at the first portion 3060*a* than at the second portion 3060*b*.

The areas of the welding portions 3061a and 3061b are substantially equal to each other, and therefore, the Joule heat generating when the current is caused to flow through between the first electrode 3020a and the second electrode 3020b is substantially the same at both the welding portions 3061a and 3061b. As regards the Peltier effect, heat generation occurs at one welding point and heat absorption occurs at the other welding point, and therefore, the loss of the thermal balance between the welding portions 3061a and 3061b occurs. Therefore, at the welding point (welding portion 3061a) where the heat generation occurs by the Peltier effect, the first portion 3060a with large thermal capacity is disposed at that the degree of the temperature rise becomes moderate. On the other hand, at the welding point (welding portion 3061b) where the heat absorption occurs by the Peltier effect, the second portion 3060b with small thermal capacity is disposed so that the degree of the temperature rise becomes abrupt. By this, the degrees of the temperature rise at the welding portions 3061a and 3061b become substantially equal to each other, so that stable welding can be carried out.

As described above, the thermal capacity of the first portion 3060a and the thermal capacity of the second portion 3060b are made different from each other, so that the stable welding can be carried out even when the loss of the thermal balance by the Peltier effect occurs. As described above, according to the embodiment 8, a degree of improper welding can be reduced.

Next, embodiments 9 to 14 will be described.

In the constitution described in the embodiment 1, there is a possibility that the following problem occurs. The problem will be described based on FIGS. 27 and 28. Pressure is applied in a state in which the copper is sandwiched by the irons, and therefore, the following problem arises. Parts (a) and (b) of FIG. 28 are schematic view for illustrating the problem, and are enlarged views in which the welding portions shown in part (c) of FIG. 27 is rotated by 90°. Part (a) of FIG. 28 is the schematic view showing a state before the welding and part (b) of FIG. 28 is the schematic view showing a state after the welding. When the current is caused to flow through between a first electrode 407 and a second electrode 408 under application of pressure in arrow 409 directions, a ground terminal 403 is softened and collapsed. On the other hand, in an inlet metal plate 4028, reaction forces 4010 generate. Then, by the reaction forces 4010, the inlet metal plate 4028 is bent inward (toward the ground terminal 403 side) from points A, as starting points, which are contact portions of the inlet metal plate 4028 with the first electrode 407 or the second electrode 408. Further, an angle of bending of the bent portion is, as shown in part (b) of FIG. 28, larger on a right-hand side (where the inlet metal plate 4028 continues) than on a left-hand side (where the inlet metal plate 4028 opens). The reason therefor is that a fold-back portion of the inlet metal plate 4028 exists on the right-hand side, and therefore, even when the ground terminal 403 is crushed, a position of the fold-back portion does not readily change. On the other hand, on the left-hand side, free end portions of the ground terminal 403 exist, and therefore, an external force for fixing a position thereof is not exerted. Therefore, the inlet metal plate 4028 is more readily bent on the right-hand side than on the left-hand side. Thus, the bending occurs at the points A, and on an opposite surface of the inlet metal plate 4028, the inlet metal plate 4028 is warped outward (toward the electrodes). Although the angles of the bending on the left-hand side and the right-hand side are different from each other, but cracks 4011 occur on each side.

On the inlet, a mechanical stress is exerted when a user inserts a power supply cable in the inlet or by vibration during transportation or the like in a state in which the inlet is incorporated in a product, and therefore, the inlet metal plate and the ground terminal are required to have great mechanical strength. However, in the case where the crack 4011 as described with reference to FIG. 28 occurs, sufficient mechanical strength cannot be ensured and there is a liability than an electric conduction property lowers.

Embodiment 9

[Structure of Inlet Metal Plate and Ground Terminal]

Parts (a) to (d) of FIG. 17 are schematic views for illustrating a structure of the inlet metal plate and the ground terminal in an embodiment 9, in which a crack occurring during welding between the inlet metal plate and the ground terminal. The ground terminal is formed of the copper which is the first metal material, and the inlet metal plate is formed of iron which is the second metal material different from the first metal material. Incidentally, a melting point of the copper is lower than a melting point of the iron. Also, in the embodiment 9, the structure of the inlet metal plate (inlet) is similar to those shown in parts (a) and (b) of FIG. 27, and the respective portions are represented by the same reference numerals or symbols. Further, a state when the ground terminal 403 and the inlet metal plate 4028 are welded to each other is similar to the state shown in FIG. 27, and the respective portions are represented by the same reference numerals or symbols. Further, an overlapping structure between the respective metal materials in the welding portions is the same as the overlapping structure described with reference to FIG. 28. Part (a) of FIG. 17 is a projection view showing the welding portions as viewed obliquely. In this figure, the first electrode 407 is disposed on an upper side, and the second electrode 408 is disposed on a lower side, and the first electrode 407, a first inlet metal plate 405, the ground terminal 403, a second inlet metal plate 406 and the second electrode 408 are superposed in a named order. Part (b) of FIG. 17 is a top plan view in which the projection view of part (a) of FIG. 17 is viewed from the first electrode 407 side in a two-dimensional form. Part (c) of FIG. 17 is a side view of the structure as viewed from a side-surface side (right-band side of part (a) of FIG. 17) of the ground terminal 403, and part (d) of FIG. 17 is a side view of the structure as viewed from the free end side (opposite from the mold portion 404 (FIG. 27) (the front side of part (a) of FIG. 17) of the ground terminal 403.

In the embodiment 9, the inlet includes the first inlet metal plate 405 and the second inlet metal plate 406. Incidentally, in FIG. 17, the first inlet metal plate 405 and the second inlet metal plate 406 are shown as separate members, but as shown in FIG. 27, the bent portion is provided on the right-hand side in part (a) of FIG. 17, and these inlet metal plates may also be disposed integrally with each other via the bent portion. The ground terminal 403 contacts the first inlet metal plate 405 at a first surface thereof and contacts the second inlet metal plate 406 at a second surface thereof.

A first region where the first electrode 407 and the first inlet metal plate 405 are in contact with each other is a contact region 4012 (hatched portion). A second region where the first inlet metal plate 405 and the first surface of the ground terminal 403 are in contact with each other is a contact region 4013 (lateral line portion). Here, when this structure is viewed from the first electrode 407 side, i.e., when the structure is viewed as in the case of the top plan view of part (b) of FIG. 17, the contact region 4013 falls within the contact region 4012.

Further, contact regions of the inlet metal plate 406 disposed on a lower side while sandwiching the ground terminal 403 between itself and the inlet metal plate 405 are similarly constituted. That is, a third region where the second electrode 408 and the second inlet metal plate 406 are in contact with each other is a contact region 4014 (hatched line portion). A fourth region where the second inlet metal plate 406 and the second surface of the ground terminal 403 are in contact with each other is a contact region 4015 (lateral line portion). Here, when this structure is viewed from the second electrode 408 side, the contact region 4015 falls within the contact region 4014. Incidentally, in the conventional constitution shown in FIG. 28, for each of the both electrodes, the contact region between the ground terminal 403 and the inlet metal plate is in a state in which this contact region is protruded from the contact region between the electrode (407 or 408) and the inlet metal plate 4028, so that a relationship of the contact regions in the embodiment 9 is opposite from the relationship of the contact regions in the conventional example (constitution).

[Reason why Occurrence of Crack is Prevented]

A mechanism of the embodiment 9 for preventing occurrence of the cracks 11 described in the conventional example will be described. FIG. 18 shows a state when a welding operation is performed. As described in the conventional example with reference to FIG. 28, when the current is caused to flow through between the first electrode 407 and the second electrode 408 in arrow 409 directions under application of pressure (welding step), the ground terminal 403 is softened and collapsed. Then, regions 4010 are generated in a direction toward the first inlet metal plate 405 and in a direction toward the second inlet metal plate 406, respectively. In the embodiment 9, the contact region 4013 falls within the contact region 4012, and therefore, even when the reaction force 4010 is generated in the direction of the first inlet metal plate 405, the reaction force 4010 can be received by the first inlet metal plate 405 contacting the first electrode 407. For this reason, the first inlet metal plate 405 is not distorted, so that there is no occurrence of the crack. Similarly, on a side under the ground terminal 403, the contact region 4015 falls within the contact region 4014, and therefore, even when the reaction force 4010 is generated in the direction of the second inlet metal plate 406, the reaction force 4010 can be received by the second inlet metal plate contacting the second electrode 408. For this reason, the second inlet metal plate 406 is not distorted, so that there is no occurrence of the crack. As described above, in the embodiment 9, a region in which the reaction force 4010 can be received is ensured in each of the contact region between the first electrode 407 and the first inlet metal plate 405 and the contact region between the second electrode 408 and the second inlet metal plate 406.

As described above, according to the embodiment 9, the mechanical strength in the inlet is ensured, so that a lowering in electric conduction property can be prevented.

Embodiment 10

[Structure of Inlet Metal Plate and Ground Terminal]

The structure in which the crack does not occur in the inlet metal plate will be described in a constitution different from the constitution of the embodiment 9. Incidentally, also, in an embodiment 10, the region where the reaction force 4010 can be received is ensured in each of the contact region between the first electrode 407 and the first inlet metal plate 405 and the contact region between the second electrode 408 and the second inlet metal plate 406. Parts (a) to (d) of FIG. 19 are schematic views for illustrating a welding structure in the embodiment 10. Also, in the embodiment 10, an overlapping structure between the respective metal materials in each of the welding portions is the same as the overlapping structure of the contents described with reference to FIG. 28 and the like, and constituent elements identical to those which have already been described above are represented by the same reference numerals or symbols and will be omitted from description. Part (a) of FIG. 19 is a projection view of the welding portions as viewed obliquely. Part (b) of FIG. 19 is a top plan view of the projection view of part (a) of FIG. 19 as viewed from the first electrode 407 side in a two-dimensional form. Part (c) of FIG. 19 is a side view as viewed from a side-surface side of the ground terminal 403, and part (d) of FIG. 19 is a side view as viewed from a free end side of the ground terminal 403. Also, in the embodiment 10, an order of superposition of the two electrodes, the ground terminal and the inlet metal plates is the same as the order of superposition in the embodiment 9. Further, the contact region between the first electrode 407 and the first inlet metal plate 405 and the contact region between the second electrode 408 and the second inlet metal plate 406 are also similar to those in the embodiment 9.

Here, in the embodiment 10, a first projected portion 4016 projecting from the first inlet metal plate 405 on a side of a surface of the first inlet metal plate 405 opposite from the contact region 4012, i.e., on a first surface side of the ground terminal 403 is provided. Further, a second projected portion 4017 projecting from the second inlet metal plate 406 on a side of a surface of the second inlet metal plate 406 opposite from the contact region 4014, i.e., on a second surface side of the ground terminal 403 is provided. In the embodiment 10, the first projected portion 4016 of the first inlet metal plate 405 contacts the first surface of the ground terminal 403, and the second projected portion 4017 of the second inlet metal plate 406 contacts the second surface of the ground terminal 403. When a contact region between the first projected portion 4016 and the ground terminal 403 is a contact region 16S, the contact region 16S falls within the contact region 4012 as viewed from the first electrode 407 side. Further, when a contact region between the second projected portion 4017 and the ground terminal 403 is a contact region 17S, the contact region 17S falls within the contact region 4014 as viewed from the second electrode 408 side. Incidentally, the first projected portion 4016 may only be required to be provided on the first inlet metal plate 405 so as to fall within the contact region 4012, preferably provided at a central portion of the contact region 4012. The second projected portion 4017 may only be required to be provided on the second inlet metal plate 406 so as to fall within the contact region 4014, preferably provided at a central portion of the contact region 4014. Further, it is preferable that the first projected portion 4016 and the second projected portion 4017 are disposed opposed to each other while sandwiching the ground terminal 403 therebetween.

[Reason why Occurrence of Crack is Prevented]

Subsequently, a mechanism for preventing the occurrence of the cracks 4011 described in the conventional example will be described. FIG. 20 shows a state in which a welding operation is performed in the state of the side view of part (d) of FIG. 19. When a current is caused to flow through between the first electrode 407 and the second electrode 408 in the arrow 409 directions under application of pressure, the ground terminal 403 is softened and collapsed. Further, reaction forces 4010 are generated in the direction of the first inlet metal plate 405 and the direction of the second inlet metal plate 406, respectively. In the embodiment 10, different from the conventional example, the reaction forces 4010 are generated in the first and second inlet metal plates 405 and 406 through the first and second projected portions 4016 and 4017, respectively. As regards the first inlet metal plate 405, on a surface opposite from the first projected portion 4016, the first electrode 407 exists. As regards the second inlet metal plate 406, on a surface opposite from the second projected portion 4017, the second electrode 408 exists. For this reason, the first inlet metal plate 405 and the second inlet metal plate 406 are not distorted by the reaction forces 4010 so that there is no occurrence of the cracks.

As described above, according to the embodiment 10, the mechanical strength in the inlet is ensured, so that a lowering in electric conduction property can be prevented.

Embodiment 11

[Structure of Inlet Metal Plate and Ground Terminal]

The structure in which the crack does not occur in the inlet metal plate will be described in a constitution different from the constitution of the embodiments 9 and 10. Incidentally, also, in an embodiment 11, the region where the reaction force 4010 can be received is ensured in each of the contact region between the first electrode 407 and the first inlet metal plate 405 and the contact region between the second electrode 408 and the second inlet metal plate 406. Parts (a) to (d) of FIG. 21 are schematic views for illustrating a welding structure in the embodiment 11. Part (a) of FIG. 21 is a projection view of the welding portions as viewed obliquely. Part (b) of FIG. 21 is a top plan view of the projection view of part (a) of FIG. 21 as viewed from the first electrode 407 side in a two-dimensional form. Part (c) of FIG. 21 is a side view as viewed from a side-surface side of the ground terminal 403, and part (d) of FIG. 21 is a side view as viewed from a free end side of the ground terminal 403. In the embodiment 11, in place of the first projected portion 4016 described in the embodiment 10, the ground terminal 403 is provided with a third projected portion 4018 projecting from the ground terminal 403 in the first inlet metal plate 405 direction (toward the first inlet metal plate 405 side). Further, in place of the second projected portion 4017, the ground terminal 403 is provided with a fourth projected portion 4019 projecting from the ground terminal 403 in the second inlet metal plate 406 direction (toward the second inlet metal plate 406 side).

In the embodiment 11, the third projected portion 4018 contacts a surface of the first inlet metal plate 405 opposite from a surface of the first inlet metal plate 405 where the first inlet metal plate 405 contacts the first electrode 407, and the fourth projected portion 4019 contacts a surface of the second inlet metal plate 406 opposite from a surface of the second inlet metal plate 406 where the second inlet metal plate 406 contacts the second electrode 408. When a contact region between the third projected portion 4018 and first inlet metal plate 405 is a contact region 18S, the contact region 18S falls within the contact region 4012 as viewed from the first electrode 407 side. Further, when a contact region between the fourth projected portion 4019 and the second inlet metal plate 406 is a contact region 19S, the contact region 19S falls within the contact region 4014 as viewed from the second electrode 408 side. Incidentally, the third projected portion 4018 may only be required to be provided on the ground terminal 403 so as to fall within the contact region 4012, preferably provided at a central portion of the contact region 4012. The fourth projected portion 4019 may only be required to be provided on the ground terminal 403 so as to fall within the contact region 4014, preferably provided at a central portion of the contact region 4014. Further, it is preferable that the third projected portion 4018 and the fourth projected portion 4019 are disposed symmetrically with respect to the ground terminal 403.

[Reason why Occurrence of Crack is Prevented]

Subsequently, a mechanism for preventing the occurrence of the cracks 4011 described in the conventional example will be described. FIG. 22 shows a state in which a welding operation is performed in the state of the side view of part (d) of FIG. 21. When a current is caused to flow through between the first electrode 407 and the second electrode 408 in the arrow 409 directions under application of pressure, the ground terminal 403 is softened and collapsed. The third and fourth projected portions 4018 and 4019 of the ground terminal 403 are collapsed along the first and second inlet metal plates 405 and 406, respectively, as shown in FIG. 22. Further, reaction forces 4010 are generated in the direction of the first inlet metal plate 405 and the direction of the second inlet metal plate 406, respectively. Although in the embodiment 11, different from the conventional example, the reaction forces 4010 generate, as regards the first inlet metal plate 405, on a surface opposite from the third projected portion 4018, the first electrode 407 exists. As regards the second inlet metal plate 406, on a surface opposite from the fourth projected portion 4019, the second electrode 408 exists. For this reason, the first inlet metal plate 405 and the second inlet metal plate 406 are not distorted by the reaction forces 4010 so that there is no occurrence of the cracks.

That is, similarly as in the embodiment 9, on opposite surfaces where the reaction forces 4010 generate, the first and second electrodes 407 and 408 which receive the reaction forces 4010 exist, so that the cracks of the first and second inlet metal plates 405 and 406 are prevented.

As described above, according to the embodiment 11, the mechanical strength in the inlet is ensured, so that a lowering in electric conduction property can be prevented.

Embodiment 12

As described in the embodiments 9, 10, 11, in order to prevent the cracks, there is a need that the reaction forces generated in the first and second inlet metal plates 405 and 406 during the welding are received by the first and second electrodes 407 and 408, respectively. Further, the first projected portion 4016 and the third projected portion 4018 may preferably be disposed at a central portion of the contact region 4012, and the second projected portion 4017 and the fourth projected portion 4019 may preferably be disposed at a central portion of the contact region 4013. This is because it is possible to apply stable pressure during the welding. Therefore, in an embodiment 12, a method of accurately perform the welding at the above-described portions is described.

[Structure of Inlet Metal Plate and Ground Terminal]

Parts (a) to (d) of FIG. 23 are schematic views for illustrating a welding structure in the embodiment 12. Part (a) of FIG. 23 is a projection view of the welding portions as viewed obliquely. Part (b) of FIG. 23 is a top plan view of the projection view of part (a) of FIG. 23 as viewed from the first electrode 407 side in a two-dimensional form. Part (c) of FIG. 23 is a side view as viewed from a side-surface side of the ground terminal 403, and part (d) of FIG. 23 is a state view as viewed from a free end side of the ground terminal 403. In the embodiment 12, the first inlet metal plate 405 includes a first recessed portion 4022 on the first electrode 407 side, and the first electrode 407 includes a fifth projected portion 4020 so as to enter the first recessed portion 4022. On the other hand, the second inlet metal plate 406 includes a second recessed portion 4024 on the second electrode 408 side, and the two electrode 408 includes a sixth projected portion 4021 so as to enter the second recessed portion 4024.

Further, similarly as in the embodiment 10, the first inlet metal plate 405 includes the first projected portion 4016 on the ground terminal 403 side, and the ground terminal 403 includes a third recessed portion 4023 so that the first projected portion 4016 enters the third recessed portion 4023. On the other hand, similarly as in the embodiment 10, the second inlet metal plate 406 includes the second projected portion 4017 on the ground terminal 403 side, and the ground terminal 403 includes a fourth recessed portion 4025 so that the second projected portion 4017 enters the fourth recessed portion 4025. As viewed from the first electrode 407 or the second electrode 408, the fifth projected portion 4020 and the first projected portion 4016 or the sixth projected portion 4021 and the second projected portion 4017 fall within the contact region 4012 or the contact region 4014, respectively. Incidentally, the fifth projected portion 4020, the first projected portion 4016, the second projected portion 4017 and the sixth projected portion 4021 may also be changed to recessed portions, and the first recessed portion 4022, the third recessed portion 4023, the fourth recessed portion 4025 and the second recessed portion 4024 may also be changed to projected portions.

By doing so, each of a relative position between the first electrode 407 and the first inlet metal plate 405, a relative position between the first inlet metal plate 405 and the ground terminal 403, a relative position between the ground terminal 403 and the second inlet metal plate 406, and a relative position between the second inlet metal plate 406 and the second electrode 408 is not deviated. When pressure welding is performed in the structure as described above, a welding place is disposed at a central portion to be pressed, and therefore, a welding surface is stabled, so that it becomes possible to perform welding improved in mechanical strength and conduction property. Incidentally, as regards the crack during the welding, as described in the embodiment 10, this is the same as in a constitution in which the first inlet metal plate 405 and the second inlet metal plate 406 are provided with projections, and therefore the crack does not occur.

[Processing Method of First Inlet Metal Plate 405 and Second Inlet Metal Plate 406]

Next, a specific processing method in the embodiment 12 will be described. Parts (a) to (d) of FIG. 24 are schematic views for illustrating the processing method of the first inlet metal plate 405 and the second inlet metal plate 406. Part (a) of FIG. 24 shows a state in which the first inlet metal plate 405 and the second inlet metal plate 406 constitute an integral metal plate. A material of the first inlet metal plate 405 and the second inlet metal plate 406 is iron, and therefore, it is difficult to process the iron by a router, so that processing such as extrusion with a die, bending, cutting or the like is carried out. First, an iron plate 4056 cut in a predetermined size is subjected to, for example, the extrusion with the die, so that the first projected portion 4016, the second projected portion 4017, the first recessed portion 4022 and the second recessed portion 4024 are formed. Further, as shown in part (b) of FIG. 24, the integral iron plate 4056 is bent in an arrow 4026 direction shown in part (a) of FIG. 24, so that the first projected portion 4016 and the second projected portion 4017 establish an opposing positional relationship. By this, a bent portion 4027 is formed on the iron plate 4056. Next, as shown in part (c) of FIG. 24, the bent portion 4027 of the iron plate 4056 is cut, so that one of resultant two iron plates 4056 is formed as the first inlet metal plate 405, and the other plate is formed as the second inlet metal plate 406.

[Processing Method of Ground Terminal]

Next, processing of the ground terminal 403 will be described. The processing is easy, and therefore, the drawing will be omitted. The ground terminal 403 is formed of a copper material, and is relatively soft and is easy to process. Further, in the embodiment 12, the third recessed portion 4023 and the fourth recessed portion 4025 are formed at positions which are the same as viewed in a vertical (up-down) direction, and therefore, the ground terminal 403 has a thickness of about several mm. Therefore, the third recessed portion 4023 and the fourth recessed portion 4025 are prepared by the router such as a drill. As described above, the ground terminal 403, the first inlet metal plate 405 and the second inlet metal plate 406 are processed and are superposed in the order shown in FIG. 23, so that the projected portions and the recessed portions are engaged and positioned with each other and then the welding is performed.

Incidentally, in part (c) of FIG. 24, the processing in which the bent portion 4027 of the iron plate 4056 is cut from the iron plate 4056 was carried out, but in the welding step, an instantaneous large current is caused to flow, and therefore, it is possible to perform the welding without cutting and separating the iron plate 4056. Further, in the embodiments 9 to 12, vertically symmetrical constitutions with respect to the ground terminals 403 were described, but as regards the upper and lower structures, even when any combination of all the embodiments is employed, the problem of the present invention is solved, so that it is possible to ensure electric conduction and mechanical strength.

As described above, according to the embodiment 12, the mechanical strength of the inlet is ensured, so that a lowering in electric conduction property can be prevented.

Embodiment 13

[Structure of Inlet Metal Plate and Ground Terminal]

Parts (a) to (d) of FIG. 25 are schematic views for illustrating a welding structure in an embodiment 13. Also, in the embodiment 13, an overlapping structure of respective metal materials at welding portions is the same as the overlapping structure described with reference to FIG. 28, and will be omitted from description by using the same reference numerals or symbols. Part (a) of FIG. 25 is a projection view of the welding portions as viewed obliquely. Part (b) of FIG. 25 is a top plan view of the projection view of part (a) of FIG. 25 as viewed from the first electrode 407 side in a two-dimensional form. Part (c) of FIG. 25 is a side view as viewed from a side-surface side of the ground terminal 403, and part (d) of FIG. 25 is a side view as viewed from a free end side of the ground terminal 403. Also, in the embodiment 13, the overlapping order of the first electrode 407, the second electrode 408, the ground terminal 403, the first inlet metal plate 405 and the second inlet metal plate 406 is the same as the overlapping order in the embodiment 9. In the embodiment 13, on the basis of the structure of FIG. 18 in the embodiment 10, the first inlet metal plate 405 is provided with the first recessed portion 4022 and the second inlet metal plate 406 is provided with the recessed portion 4024. In this case, by the extrusion processing described in the embodiment 12 with reference to FIG. 24, the first projected portion 4016 and the first recessed portion 4022, and the second projected portion 4017 and the second recessed portion 4024 can be formed. Thus, similarly as in the above-described embodiments, the cracks in the first inlet metal plate 405 and the second inlet metal plate 406 are prevented.

As described above, according to the embodiment 13, the mechanical strength of the inlet is ensured, so that a lowering in electric conduction property can be prevented.

Embodiment 14

[Structure of Inlet Metal Plate and Ground Terminal]

Parts (a) to (d) of FIG. 26 are schematic views for illustrating a welding structure in an embodiment 14, and constituent elements identical to those in the above-described embodiments are represented by the same reference numerals or symbols and will be emitted from description. Also, in the embodiment 14, an overlapping structure of respective metal materials at welding portions is the same as the overlapping structure described with reference to FIG. 28, and will be omitted from description by using the same reference numerals or symbols. Part (a) of FIG. 26 is a projection view of the welding portions as viewed obliquely. Part (b) of FIG. 26 is a top plan view of the projection view of part (a) of FIG. 26 as viewed from the first electrode 407 side in a two-dimensional form. Part (c) of FIG. 26 is a side view as viewed from a side-surface side of the ground terminal 403, and part (d) of FIG. 26 is a side view as viewed from a free end side of the ground terminal 403. Also, in the embodiment 14, the overlapping order of the first electrode 407, the second electrode 408, the ground terminal 403, the first inlet metal plate 405 and the second inlet metal plate 406 is the same as the overlapping order in the embodiment 9. In the embodiment 14, on the basis of the structure shown in FIG. 23 of the embodiment 12, the second projected portion 4017, the sixth projected portion 4021, the second recessed portion 4024 and the fourth recessed portion 4025 are not provided. That is, in the embodiment 14, the second inlet metal plate 406 and the second surface of the ground terminal 403 are not provided with the projected portions and the recessed portions. Incidentally, a constitution in which the first inlet metal plate 405 is not provided with the projected portions and the recessed portions but in which the second inlet metal plate 406 is provided with the similar projected portions and recessed portions may also be employed. Further, a constitution in which the projected and recessed portions which are provided on both sides of the ground terminal 403 may also be provided on either one of the both sides may also be employed. Even in such a constitution, the region in which the reaction forces can be received is ensured in each of the contact region between the first electrode 407 and the first inlet metal plate 405 and the contact region between the second electrode 408 and the second inlet metal plate 406. For this reason, the cracks in the first inlet metal plate 405 and the second inlet metal plate 406 are prevented.

As described above, according to the embodiment 14, the mechanical strength of the inlet is ensured, so that a lowering in electric conduction property can be prevented.

Embodiment 15

In an embodiment 15, a constitution in which the different metal material joint (welding) structures of the embodiments 1 to 14 are applied to the ground terminal mounted on a power supply substrate (board) used in an image forming apparatus as an example of the electronic device will be described.

[Laser Beam Printer]

In FIG. 29, a general structure of a laser beam printer is shown as an example of the image forming apparatus. A laser beam printer 1000 includes a photosensitive drum 1010, a charging portion 1020 and a developing portion 1030. The photosensitive drum 1010 is an image bearing member on which an electrostatic latent image is formed. The charging portion 1020 electrically charges the photosensitive drum 1010 uniformly. The developing portion 1030 develops the electrostatic latent image, formed on the photosensitive drum 1010, with toner into a toner image. The toner image formed on the photosensitive drum 1010 (image bearing member) is transferred by a transfer portion 1050 onto a sheet P as a recording material supplied from a cassette 1040, and the (unfixed) toner image transferred on the sheet P is fixed on the sheet P by a fixing device 1060, and then the sheet P is discharged onto a tray 1070. The photosensitive drum 1010, the charging portion 1020, the developing portion 1030 and the transfer portion 1050 constitute an image forming portion. Further, the printer 1000 is provided with a power supply device 1080, and electric power is supplied from the power supply device 1080 to a driving portion such as a motor and to a controller 5000. The printer 1000 includes a casing metal plate 7, a casing metal plate 6 fastened to the casing metal plate 7 with screws 8, and an inlet 5 held by the casing metal plate 6 (FIG. 1). In the inlet 5, a power supply cord (not shown) is engaged, so that AC electric power is supplied to the power supply device 1080. The controller 5000 includes a CPU (not shown) and controls an image forming operation by the image forming portion and a feeding operation of the sheet P, and the like operation. Incidentally, the casing metal plate 6 corresponds to the metal plates 30, 32, 34 and 36 in the embodiment 1 and the metal plates 40, 42, 44 and 46 in the embodiment 1. Incidentally, the image forming apparatus to which the welding method in the present invention is applicable is not limited to the image forming apparatus shown in FIG. 30.

[Connection Structure in Image Forming Apparatus]

FIG. 30 is a schematic view showing a structure including the inlet 5, a power supply metal plate 53, a power supply substrate 50 and a ground terminal 3. The power supply metal plate 53 is a metal plate in the printer 1000, and the power supply substrate 50 is a circuit substrate (board) of the power supply device 1080. The power supply metal plate 53 includes joining portions 52, 56 and 57. The power supply substrate 50 is provided with substrate ground terminals 54 and 55.

An inlet terminal 1 of the inlet 5 is joined to the power supply substrate 50 by a bundle wire 51a, and an inlet terminal 2 is joined to the power supply substrate 50 by a bundle wire 51b. By this, electric power from an AC power supply (source) (not shown) to the power supply substrate 50. Further, the ground terminal 3 of the inlet 5 is joined to the power supply metal plate 53 by the joining portion 52. Incidentally, the joining portion 52 is a portion where the first portion and the second portion which were described in the above-described embodiments, and the ground terminal 3 of the inlet 5 are joined to each other. The substrate ground terminals 54 and 55 are terminals mounted on the power supply substrate 50 and are joined to the joining portions 56 and 57, respectively, of the power supply metal plate 53.

Further, the power supply substrate 50 and the power supply metal plate 53 are held by a frame mold (not shown).

[Application to Joining Portions 56 and 57]

FIG. 31 is a schematic view showing details of the substrate ground terminal 55 and the joining portion 57. The substrate ground terminal 55 is mounted on a component (part) mounting surface of the power supply substrate 50 and is joined to a substrate pattern on a back-side soldering surface by soldering. A bent-processed portion 55a is a portion formed by bending (processing), and is subjected to bending in a direction substantially perpendicular to the surface of the power supply substrate 50 and has a shape such that the bent-processed portion 55a extends to an outside of the power supply substrate 50. Here, one surface of the bent-processed portion 55a is a surface 551a and the other surface is a surface 551b. The power supply metal plate 53 includes a first portion 53a, a second portion 53b and a bent portion 53e.

The first portion 53a and the second portion 53b of the power supply metal plate 53 sandwich the bent-processed portion 55a of the substrate ground terminal 55. The first portion 53a and the surface 551a of the bent-processed portion 55a are joined to each other by welding, and the second portion 53b and the surface 551b of the bent-processed portion 55a are joined to each other by welding. Each of the first portion 53a and the second portion 53b is provided with the projected portions described in the embodiments 1 and 2. Incidentally, the shape and the structure of the projected portions are similar to those described in the embodiments 1 and 2 and will be omitted from description. The substrate ground terminal 54 and the joining portion 56 also have the same constitutions, and therefore, will be omitted from description.

By employing the above-described constitution, the projected portions in the present invention are also applicable to the substrate ground terminals of the power supply substrate used in the image forming apparatus. Further, a constitution in which the substrate ground terminals are provided with the projected portions may also be employed. As described above, according to the embodiment 15, a degree of improper welding is reduced, so that productivity can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2020-081432 filed on May 1, 2020, 2020-081433 filed on May 1, 2020, 2020-105971 filed on Jun. 19, 2020, 2020-105972 filed on Jun. 19, 2020, 2021-003570 filed on Jan. 13, 2021, which are hereby incorporated by reference herein in their entirety.

What is claimed is:

1. An electronic device comprising:
    an inlet including a ground terminal having a first surface and a second surface opposite from the first surface;
    a first casing metal plate configured to hold said inlet and contacting the first surface of said ground terminal; and
    a second casing metal plate contacting the second surface of said ground terminal.

2. An electronic device according to claim 1, wherein said inlet includes a mold portion configured to hold said ground terminal at one end of said ground terminal, and
    wherein said ground terminal includes, between a joining portion joined to said first casing metal plate and a second casing metal plate and a contact portion where said one end of said ground terminal and said mold portion are in contact with each other, a portion increased in thermal resistance than said joining portion and said contact portion.

3. An electronic device according to claim 2, wherein said ground terminal includes a cut-away portion between said joining portion and said contact portion.

4. An electronic device according to claim 2, wherein said ground terminal includes, between said joining portion and said contact portion, a portion smaller in width of said ground terminal with respect to a widthwise direction than said joining portion and said contact portion.

5. An electronic device according to claim 4, wherein said ground terminal includes, between said joining portion and said contact portion, a portion thinner in thickness than said joining portion and said contact portion.

6. An electronic device according to claim 4, wherein said ground terminal includes a recessed portion between said joining portion and said contact portion.

7. An electronic device according to claim 4, wherein said ground terminal includes at least one hole between said joining portion and said contact portion.

8. An image forming apparatus for forming an image on a recording material, comprising:
    an inlet including a ground terminal having a first surface and a second surface opposite from the first surface;
    a first casing metal plate configured to hold said inlet and contacting the first surface of said ground terminal; and
    a second casing metal plate contacting the second surface of said ground terminal.

9. A welding method comprising:
    a welding step in which in a state that a first member made of a first metal and a second member made of a second metal sandwich a third member made of a third metal, a first electrode is contacted to the first member and a second electrode is contacted to the second member and in which a current is caused to flow through between the first electrode and the second electrode by applying forces to the first electrode and the second electrode toward the third member,
    wherein the first member includes at least one first projected portion projecting toward the third member, and the second member includes at least one second projected portion projecting toward the third member, and
    wherein in said welding step, the first member and a first surface of the third member are joined to each other, and the second member and a second surface, opposite from the first surface, of the third member are joined to each other.

10. An inlet unit comprising:
    a ground terminal made of a first metal and having a first surface and a second surface positioned opposite from the first surface; and
    a member made of a second metal and including a bent portion and a flat surface portion, wherein said member is provided so as to sandwich said ground terminal and wherein the flat surface portion of said member and the first surface and the second surface of said ground terminal are joined to each other by welding, and
    wherein a cross-sectional area of the bent portion is smaller than a cross-sectional area of the flat surface portion.

11. An inlet unit according to claim 10, wherein the second metal is a metal plate for holding said ground terminal.

12. A welding method comprising:

a welding step in which that a first member made of a first metal and a second member made of a second metal sandwich a third member made of a third metal, in which a first electrode is contacted to the first member and a second electrode is contacted to the second member and in which a current is caused to flow through between the first electrode and the second electrode by applying forces to the first electrode and the second electrode toward the third member, wherein in said welding step, an area of a first welding portion where the first member and a first surface of the third member are welded to each other and an area of a second welding portion where the second member and a second surface, opposite from the first surface, of the third member are welded to each other are made different from each other.

13. A welding method for welding a ground terminal which is made of a first metal material and which has a first surface and a second surface opposite from the first surface, and a first inlet metal plate and a second inlet metal plate which are made of a second metal material different from the first metal material, to each other, said welding method comprising:

a welding step in which in a state that the first inlet metal material and the first surface of the ground terminal are in contact with each other and that the second inlet metal material and the second surface of the ground terminal are in contact with each other, a first electrode is contacted to the first inlet metal plate and a second electrode is contacted to the second inlet metal plate and in which a current is caused to flow through between the first electrode and the second electrode by applying forces to between the first electrode and the second electrode, wherein as viewed from the first electrode side, a first region where the first electrode and the first inlet metal plate are in contact with each other includes a second region where the first inlet metal plate and the first surface of the ground terminal are in contact with each other, and wherein as viewed from the second electrode side, a third region where the second electrode and the second inlet metal plate are in contact with each other includes a fourth region where the second inlet metal plate and the second surface of the ground terminal are in contact with each other.

* * * * *